US012639434B2

(12) United States Patent　　　　　(10) Patent No.:　US 12,639,434 B2
Rogers　　　　　　　　　　　　　　　　(45) Date of Patent:　　May 26, 2026

(54) TIME-OF-SCAN PROTECTION FOR A SCANNABLE ENCODED IMAGE IN AN ELECTRONIC MESSAGE OR AN ELECTRONIC FORM

(71) Applicant: Microsoft Technology Licensing, LLC, Redmond, WA (US)

(72) Inventor: Jason Timothy Rogers, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 18/395,463

(22) Filed: Dec. 22, 2023

(65) Prior Publication Data

US 2025/0209168 A1　　　Jun. 26, 2025

(51) Int. Cl.
　　*G06F 21/56*　　　　(2013.01)
　　*G06F 21/53*　　　　(2013.01)
　　*G06F 21/60*　　　　(2013.01)
(52) U.S. Cl.
　　CPC ............ *G06F 21/565* (2013.01); *G06F 21/53* (2013.01); *G06F 21/602* (2013.01)
(58) Field of Classification Search
　　CPC ....... G06F 21/565; G06F 21/53; G06F 21/602
　　See application file for complete search history.

(56) References Cited

U.S. PATENT DOCUMENTS

2009/0319781 A1 * 12/2009 Byrum ................ H04L 63/0807
　　　　　　　　　　　　　　　　　　　713/156
2015/0095645 A1 * 4/2015 Eldar .................. H04L 63/0485
　　　　　　　　　　　　　　　　　　　713/168
(Continued)

FOREIGN PATENT DOCUMENTS

WO　　WO-2014101935 A1 * 7/2014　.............. H04L 47/70
WO　　WO-2021181391 A1 * 9/2021　........... H04L 67/535

OTHER PUBLICATIONS

"Damaged QrCode Reconstructing [closed]", Retrieved From: https://stackoverflow.com/questions/54252250/damaged-qrcode-reconstructing, Jan. 18, 2019, 6 Pages.
(Continued)

*Primary Examiner* — Ayoub Alata
(74) *Attorney, Agent, or Firm* — Wade IP Law PLLC

(57)　　　　　ABSTRACT

Techniques are described herein that are capable of providing time-of-scan protection for a scannable encoded image in an electronic message or an electronic form. An electronic message or electronic form is received. The electronic message or electronic form includes a scannable encoded image. A uniform resource identifier (URI) that is encoded in the scannable encoded image is identified by decoding the scannable encoded image. The URI identifies a target data source. A wrapped URI is generated by wrapping the URI in a wrapper. The wrapped URI identifies a substitute data source. A replacement scannable encoded image is generated by encoding the wrapped URI. A replacement electronic message or replacement electronic form is generated by replacing the scannable encoded image in the electronic message or electronic form with the replacement scannable encoded image. The replacement electronic message is provided, or the replacement electronic form is published.

20 Claims, 8 Drawing Sheets

(56)        References Cited

U.S. PATENT DOCUMENTS

| | | | |
|---|---|---|---|
| 2015/0149410 A1* | 5/2015 | Haon ..................... | G06F 16/48 |
| | | | 707/627 |
| 2022/0303308 A1* | 9/2022 | Gopathy ............. | H04L 63/1408 |

OTHER PUBLICATIONS

"Find and Replace Keywords with Urls Only If not Already Wrapped in a Url", Retrieved From: https://stackoverflow.com/questions/4522143/find-and-replace-keywords-with-urls-only-if-not-already-wrapped-in-a-url, Dec. 23, 2010, 2 Pages.

"How Cybercriminals Exploit QR Codes to Their Advantage", Retrieved From: https://cisomag.com/how-cybercriminals-exploit-qr-codes-to-their-advantage/, Feb. 20, 2022, 4 Pages.

"Way To Instantly Beat All Fake Login/Phishing Sites—Replace The Unsecure Steam Guard Code System with a Confirm Login Screen", Retrieved From: https://steamcommunity.com/discussions/forum/10/1736588252395257356/, Aug. 22, 2018, 5 Pages.

Brook, Chris, "4 Steps to Prevent Phishing Attacks (According to 33 Experts)", Retrieved From: https://www.digitalguardian.com/blog/phishing-attack-prevention-how-identify-prevent-phishing-attacks, Oct. 26, 2023, 22 Pages.

Davis, et al., "Set up Safe Links policies in Microsoft Defender for Office 365", Retrieved From: https://learn.microsoft.com/en-us/microsoft-365/security/office-365-security/safe-links-policies-configure?view=o365-worldwide, Sep. 19, 2023, 21 Pages.

Foley, "QR Code Phishing Scams: How It Works and How to Prevent It", Retrieved From: https://www.cyclonis.com/qr-code-phishing-scams-how-works-prevent-it/, Jul. 3, 2020, 5 Pages.

Rapp, et al., "QR Code Reconstruction", Retrieved From: https://x41-dsec.de/news/qr-code-reconstruction/#:~:text=Reconstruction%20using%20GIMP%201%20Determine%20the%20height%20of,code%20edges%20into%20the%20canvas%20edges.%20More%20items, May 3, 2021, 4 Pages.

Roohparvar, Robert, "How Cybercriminals Exploit QR Codes", Retrieved From: https://www.infoguardsecurity.com/how-cybercriminals-exploit-qr-codes/, Jan. 8, 2022, 4 Pages.

Zaw, Nyan T., "How To Decode A Partially Visible or Damaged QR Code: A CTF Writeup For Stack The Flags 2020", Retrieved From: https://medium.com/@nteezy/how-to-decode-a-partially-visible-or-damaged-qr-code-a-ctf-writeup-for-stack-the-flags-2020-4ef0eb6a018f, Dec. 7, 2020, 8 Pages.

"Experience AI-powered browsing with the new Bing built-in Get Comprehensive Answers and Summarized Information Side-by-Side in Microsoft Edge", Retrieved From: https://nam06.safelinks.protection.outlook.com/?url=https%3A%2F%2Fwww.microsoft.com%2F&data=05%7C01%7Cjarogers%40microsoft.com%7C6bbba583e4b84d3395ee08dbbd3080e3%7C72f988bf86f141af91ab2d7cd011db47%7C1%7C0%7C638311788273789133%7CUnknown%.

* cited by examiner

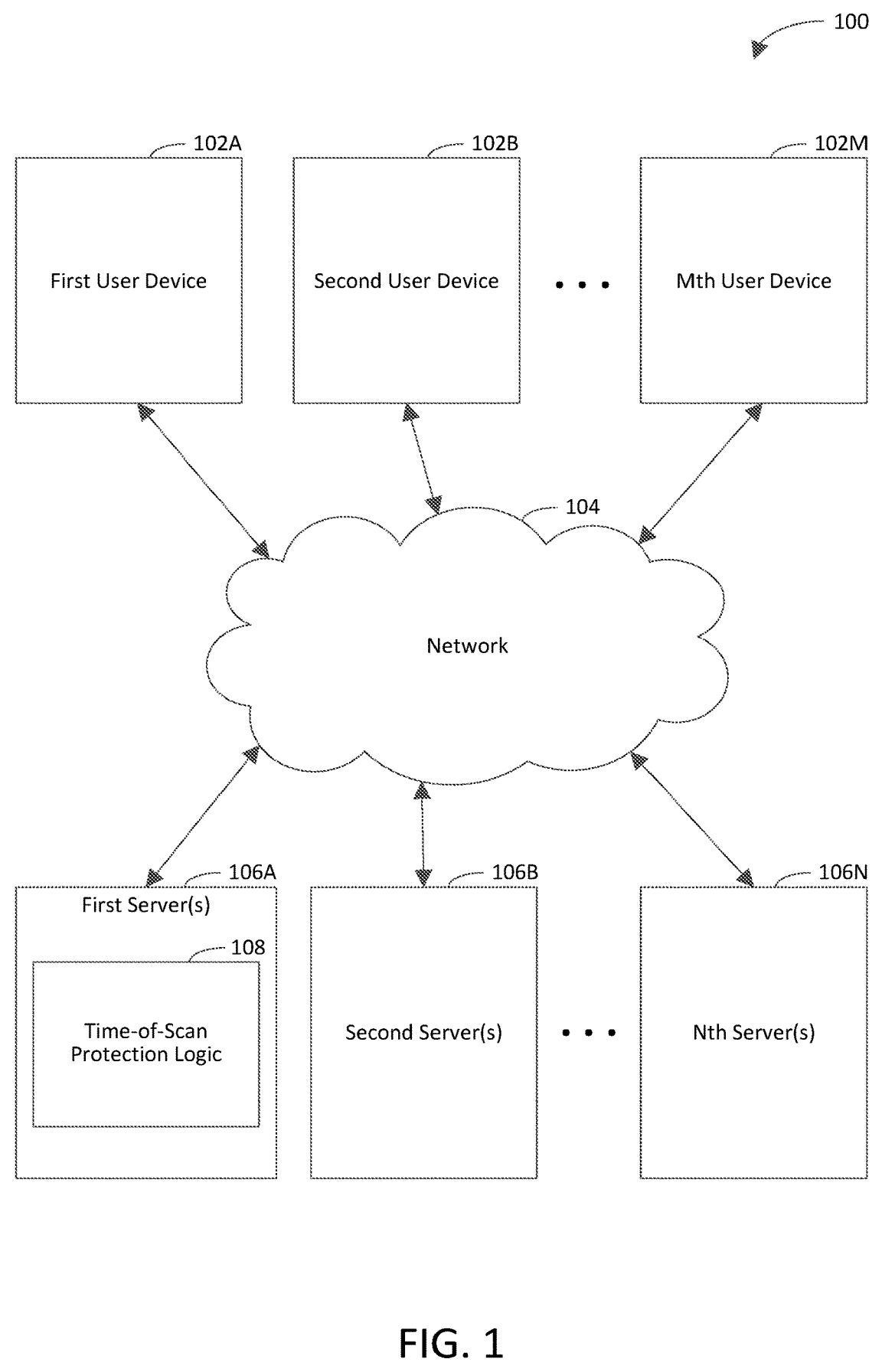

100

102A

First User Device

102B

Second User Device

• • •

102M

Mth User Device

104

Network

106A

First Server(s)

108

Time-of-Scan
Protection Logic

106B

Second Server(s)

• • •

106N

Nth Server(s)

FIG. 1

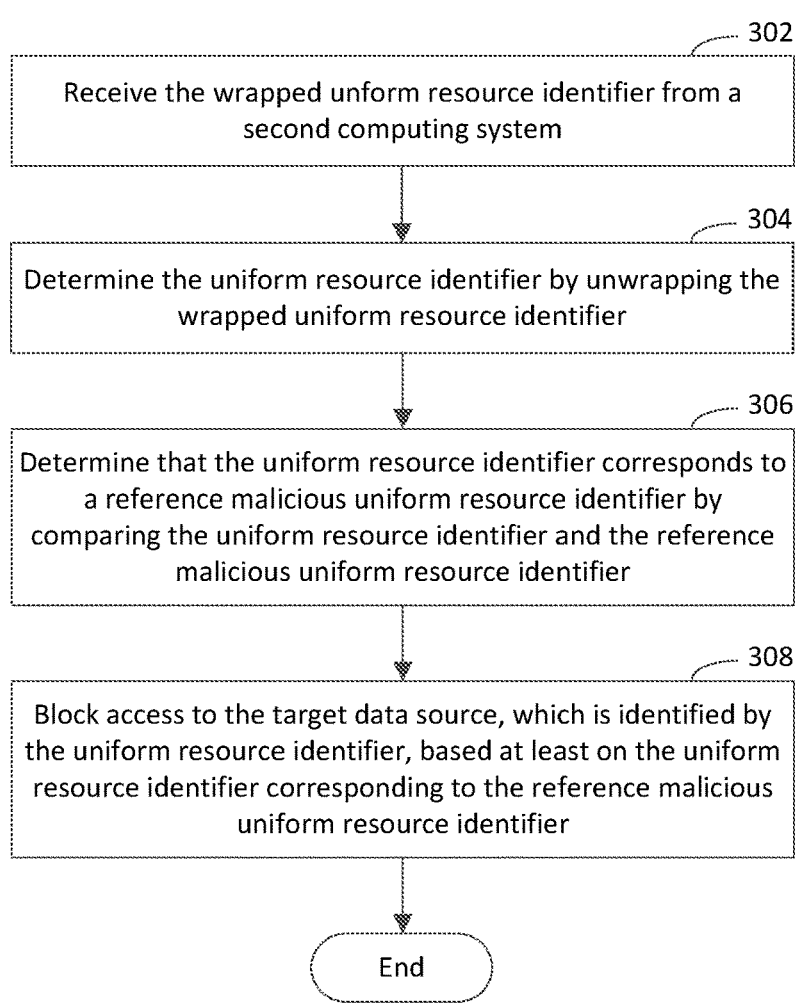

302

Receive the wrapped unform resource identifier from a second computing system

304

Determine the uniform resource identifier by unwrapping the wrapped uniform resource identifier

306

Determine that the uniform resource identifier corresponds to a reference malicious uniform resource identifier by comparing the uniform resource identifier and the reference malicious uniform resource identifier

308

Block access to the target data source, which is identified by the uniform resource identifier, based at least on the uniform resource identifier corresponding to the reference malicious uniform resource identifier End

FIG. 3

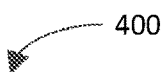

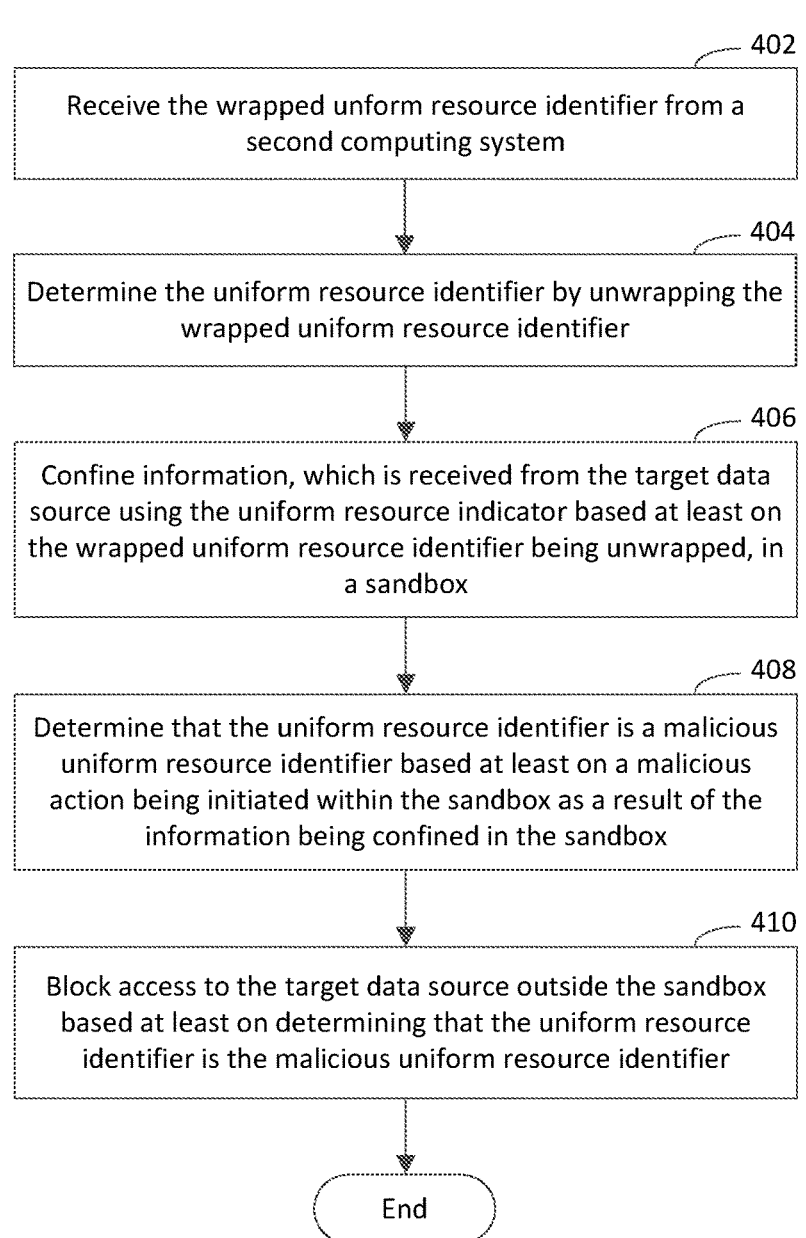

402

Receive the wrapped uniform resource identifier from a second computing system

404

Determine the uniform resource identifier by unwrapping the wrapped uniform resource identifier

406

Confine information, which is received from the target data source using the uniform resource indicator based at least on the wrapped uniform resource identifier being unwrapped, in a sandbox

408

Determine that the uniform resource identifier is a malicious uniform resource identifier based at least on a malicious action being initiated within the sandbox as a result of the information being confined in the sandbox

410

Block access to the target data source outside the sandbox based at least on determining that the uniform resource identifier is the malicious uniform resource identifier End

FIG. 4

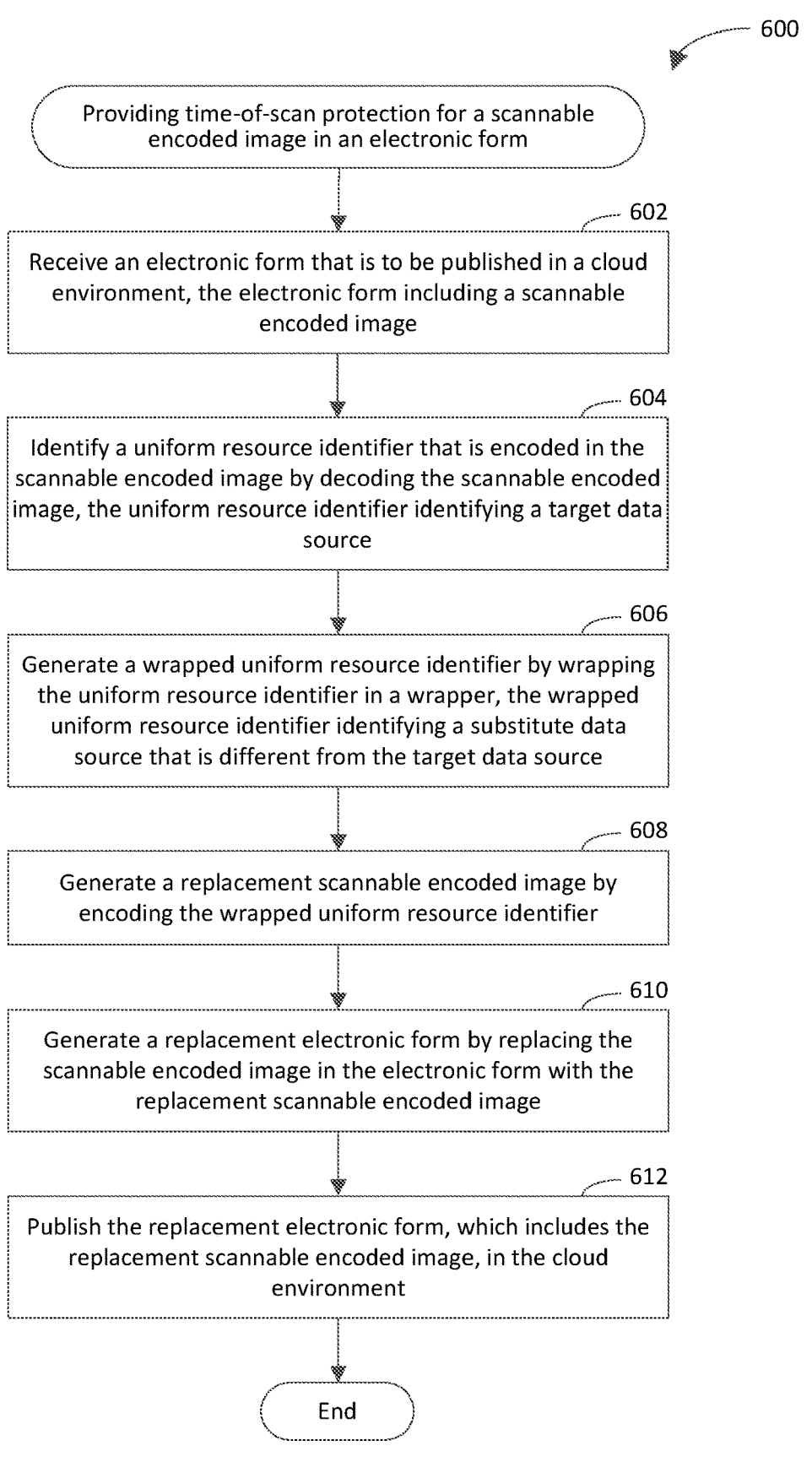

600

Providing time-of-scan protection for a scannable encoded image in an electronic form

602

Receive an electronic form that is to be published in a cloud environment, the electronic form including a scannable encoded image

604

Identify a uniform resource identifier that is encoded in the scannable encoded image by decoding the scannable encoded image, the uniform resource identifier identifying a target data source

606

Generate a wrapped uniform resource identifier by wrapping the uniform resource identifier in a wrapper, the wrapped uniform resource identifier identifying a substitute data source that is different from the target data source

608

Generate a replacement scannable encoded image by encoding the wrapped uniform resource identifier

610

Generate a replacement electronic form by replacing the scannable encoded image in the electronic form with the replacement scannable encoded image

612

Publish the replacement electronic form, which includes the replacement scannable encoded image, in the cloud environment End

FIG. 6

TIME-OF-SCAN PROTECTION FOR A SCANNABLE ENCODED IMAGE IN AN ELECTRONIC MESSAGE OR AN ELECTRONIC FORM

BACKGROUND

Phishing attacks have become quite common over the past several decades. A phishing attack is an attack in which a malicious entity sends a fraudulent message to a recipient in an effort to trick the recipient into revealing sensitive information (e.g., the recipient's credentials) to the malicious entity and/or to deploy malicious software (e.g., ransomware) on the recipient's infrastructure. For instance, the fraudulent message often purports to be from a trusted entity and includes a link associated with a uniform resource locator (URL) that points to a malicious website rather than a website of the trusted entity. Clicking on the link may cause the malicious website to present a request for sensitive information to the user. By responding to the request, the user may unwittingly provide the sensitive information to the malicious entity.

Quick-response (QR) codes are sometimes used in an effort to avoid phishing attacks. For instance, a URL may be encoded into a QR code, and the QR code (rather than a link to the URL) may be incorporated into a message that is sent to a recipient. When the recipient receives the message, the recipient may scan the QR code, for example, using a camera of a mobile device, which causes the mobile device to decode the QR code and to send the decoded URL to a web browser of the mobile device.

Security systems often analyze messages before the messages are delivered to the recipients. If a message includes a QR code, the QR code may be decoded at delivery time to determine whether the decoded URL is malicious. If the decoded URL is determined to be malicious, the message is not delivered to the recipient. If the decoded URL is not determined to be malicious, the message may be delivered to the recipient. However, the decoded URL often is weaponized only after the message is delivered to the recipient.

SUMMARY

It may be desirable to analyze a scannable encoded image (e.g., a QR code or a bar code) in an electronic message or an electronic form at scan time of the scannable encoded image. A scannable encoded image is an encoded image that is capable of being scanned with an imaging device to determine information that is encoded in the encoded image. For instance, the imaging device may process the encoded image using a technique, such as Reed-Solomon error correction, until the encoded image can be adequately interpreted. The imaging device may extract patterns from the encoded image to determine the information encoded therein. An encoded image is an image that includes encoded information. For example, the information may be encoded by defining patterns that are incorporated into the encoded image. In accordance with this example, the patterns may be defined in a horizontal component and/or a vertical component of the encoded image. Examples of a scannable encoded image include a quick-response (QR) code, developed by Denso Corporation; a linear bar code, developed by Norman Joseph Woodland and Bernard Silver; a just another barcode (JAB) code, developed by Fraunhofer Institute Secure Information Technology (SIT); a SnapTag™ code, developed by Spyder Lynk LLC; and a high capacity color barcode (HCCB) code, developed by Microsoft Corporation.

An electronic message is a message that is transmitted via an electronic medium. Examples of an electronic message include an electronic mail (email) message, a text message, an instant message, a social media message (e.g., post). Examples of a social media message include a WhatsApp® message, a LinkedIn® message, and a Twitter® message.

An electronic form is a form that is published via an electronic medium. A form is a document that includes one or more fields that are configured to receive information (e.g., textual information). For instance, a user may type text into a field of a form.

Scan time of a scannable encoded image is a time at which the scannable encoded image is scanned. For instance, scanning the scannable encoded image causes the scannable encoded image to be decoded to reveal a uniform resource identifier, which may be used to access a website. Examples of a uniform resource identifier include a uniform resource locator (URL) and a uniform resource name (URN).

Analyzing the scannable encoded image at scan time enables a phishing attack associated with the scannable encoded image to be detected even after an electronic message that includes the scannable encoded image is delivered to the recipient (or even after an electronic form that includes the scannable encoded image is published). For example, if the uniform resource identifier that is encoded in the scannable encoded image is weaponized after the electronic message is delivered (or after the electronic form is published), the analysis of the scannable encoded image at scan time may detect the phishing attack.

Various approaches are described herein for, among other things, providing time-of-scan (a.k.a. scan time) protection for a scannable encoded image in an electronic message or an electronic form. In a first example approach, an electronic message that is directed to a recipient is received. The electronic message includes a scannable encoded image. A uniform resource identifier that is encoded in the scannable encoded image is identified by decoding the scannable encoded image. The uniform resource identifier identifies a target data source. A wrapped uniform resource identifier is generated by wrapping the uniform resource identifier in a wrapper. The wrapped uniform resource identifier identifies a substitute data source that is different from the target data source. A replacement scannable encoded image is generated by encoding the wrapped uniform resource identifier. A replacement electronic message is generated by replacing the scannable encoded image in the electronic message with the replacement scannable encoded image. The replacement electronic message, which includes the replacement scannable encoded image, is provided toward the recipient.

In a second example approach, an electronic form that is to be published in a cloud environment is received. The electronic form includes a scannable encoded image. A uniform resource identifier that is encoded in the scannable encoded image is identified by decoding the scannable encoded image. The uniform resource identifier identifies a target data source. A wrapped uniform resource identifier is generated by wrapping the uniform resource identifier in a wrapper. The wrapped uniform resource identifier identifies a substitute data source that is different from the target data source. A replacement scannable encoded image is generated by encoding the wrapped uniform resource identifier. A replacement electronic form is generated by replacing the scannable encoded image in the electronic form with the replacement scannable encoded image. The replacement electronic form, which includes the replacement scannable encoded image, is published in the cloud environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 1 is a block diagram of an example time-of-scan protection system in accordance with an embodiment.

FIGS. 3-4 depict flowcharts of example methods for providing time-of-scan protection for a scannable encoded image in an electronic message or an electronic form in accordance with embodiments.

FIG. 6 depicts a flowchart of an example method for providing time-of-scan protection for a scannable encoded image in an electronic form in accordance with an embodiment.

Figure 2:
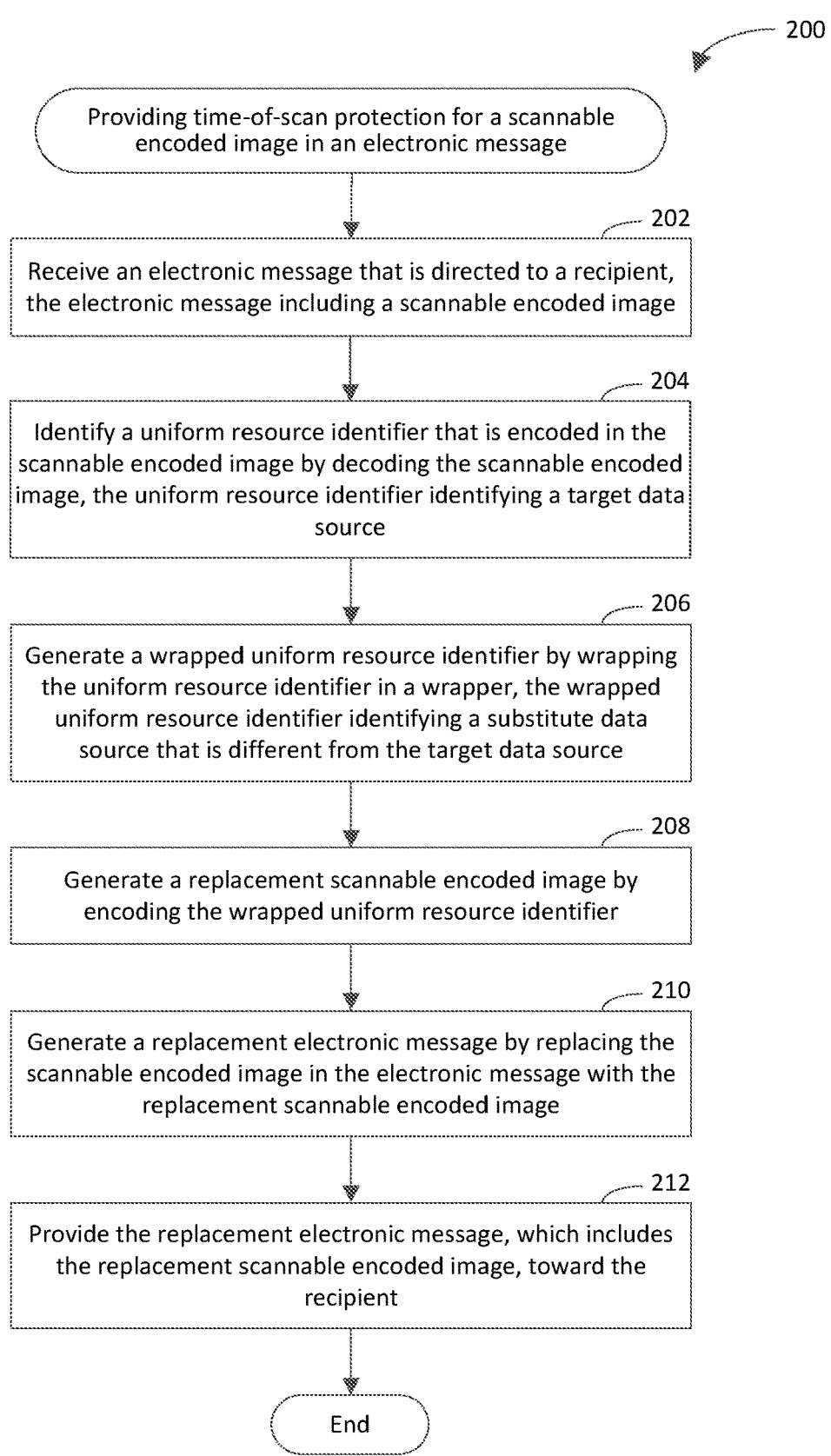
FIG. 2 depicts a flowchart of an example method for providing time-of-scan protection for a scannable encoded image in an electronic message in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

It may be desirable to analyze a scannable encoded image (e.g., a QR code or a bar code) in an electronic message or an electronic form at scan time of the scannable encoded image. A scannable encoded image is an encoded image that is capable of being scanned with an imaging device to determine information that is encoded in the encoded image. For instance, the imaging device may process the encoded image using a technique, such as Reed-Solomon error correction, until the encoded image can be adequately interpreted. The imaging device may extract patterns from the encoded image to determine the information encoded therein. An encoded image is an image that includes encoded information. For example, the information may be encoded by defining patterns that are incorporated into the encoded image. In accordance with this example, the patterns may be defined in a horizontal component and/or a vertical component of the encoded image. Examples of a scannable encoded image include a quick-response (QR) code, developed by Denso Corporation; a linear bar code, developed by Norman Joseph Woodland and Bernard Silver; a just another barcode (JAB) code, developed by Fraunhofer Institute Secure Information Technology (SIT); a SnapTag™ code, developed by Spyder Lynk LLC; and a high capacity color barcode (HCCB) code, developed by Microsoft Corporation.

An electronic message is a message that is transmitted via an electronic medium. Examples of an electronic message include an electronic mail (email) message, a text message, an instant message, a social media message (e.g., post). Examples of a social media message include a WhatsApp® message, a LinkedIn® message, and a Twitter® message (a.k.a. an X® message).

An electronic form is a form that is published via an electronic medium. A form is a document that includes one or more fields that are configured to receive information (e.g., textual information). For instance, a user may type text into a field of a form.

Scan time of a scannable encoded image is a time at which the scannable encoded image is scanned. For instance, scanning the scannable encoded image causes the scannable encoded image to be decoded to reveal a uniform resource identifier, which may be used to access a website. Examples of a uniform resource identifier include a uniform resource locator (URL) and a uniform resource name (URN).

Analyzing the scannable encoded image at scan time enables a phishing attack associated with the scannable encoded image to be detected even after an electronic message that includes the scannable encoded image is delivered to the recipient (or even after an electronic form that includes the scannable encoded image is published). For example, if the uniform resource identifier that is encoded in the scannable encoded image is weaponized after the electronic message is delivered (or after the electronic form is published), the analysis of the scannable encoded image at scan time may detect the phishing attack.

Example embodiments described herein are capable of providing time-of-scan (a.k.a. scan time) protection for a scannable encoded image in an electronic message or an electronic form. Example techniques described herein have a variety of benefits as compared to conventional techniques for protecting against a malicious attack (e.g., a phishing attack). For instance, the example techniques are capable of replacing a uniform resource identifier encoded in a scannable encoded image with a replacement uniform resource identifier to provide a replacement scannable encoded image. For example, replacing the uniform resource identifier with the replacement uniform resource identifier to provide the replacement scannable encoded image may enable the uniform resource identifier to be analyzed at scan time of the replacement scannable encoded image to determine whether the uniform resource identifier is malicious (e.g., being targeted in a phishing attack). The replacement uniform resource identifier may be used to identify the uniform resource identifier. In accordance with this example, the replacement uniform resource identifier may include the uniform resource identifier. The example techniques enable a correlation between the electronic message (or the electronic form) that includes the scannable encoded image and the event of scanning the replacement scannable encoded image by an identified computing device, which may be different from a computing device that receives the electronic message or that publishes the electronic form.

The example techniques increase security of a computing system (e.g., a mobile device) that is used to scan the replacement scannable encoded image. For example, the example techniques are capable of identifying, mitigating, and/or preventing a malicious attack associated with the scannable encoded image after an electronic message that includes the replacement scannable encoded image, which replaces the scannable encoded image, is delivered to a recipient. In another example, the example techniques are capable of identifying, mitigating, and/or preventing a malicious attack associated with the scannable encoded image after an electronic form that includes the replacement scannable encoded image is published. In both of these examples, access to information from a source indicated by the scannable encoded image may be terminated or prevented at scan time based on (e.g., based at least on) a determination that the scannable encoded image is associated with a malicious attack.

The example techniques increase an accuracy, precision, and/or reliability of a determination whether a scannable encoded image is associated with a malicious attack. For example, by providing the time-of-scan protection, the example techniques are capable of identifying the malicious attack even after an electronic message that includes the corresponding replacement scannable encoded image is delivered. For instance, providing the time-of-scan protection reduces a likelihood that the malicious attack will be inadvertently overlooked due to the scannable encoded image (e.g., the uniform resource identifier encoded therein) not being weaponized until after the electronic message is delivered. In another example, by providing the time-of-scan protection, the example techniques are capable of identifying the malicious attack even after an electronic form that includes the corresponding replacement scannable encoded image is published. For instance, providing the time-of-scan protection reduces a likelihood that the malicious attack will be inadvertently overlooked due to the scannable encoded image (e.g., the uniform resource identifier encoded therein) not being weaponized until after the electronic form is published.

The example techniques may reduce an amount of time and/or resources (e.g., processor cycles, memory, network bandwidth) that is consumed to identify, mitigate, or prevent a malicious attack with regard to an electronic message or electronic form that includes a scannable encoded image that encodes a uniform resource identifier. For example, generating a wrapped uniform resource identifier, which identifies a substitute data source that is different from the target data source, by wrapping the uniform resource identifier in a wrapper, generating a replacement scannable encoded image by encoding the wrapped uniform resource identifier, generating a replacement electronic message by replacing the scannable encoded image in the electronic message with the replacement scannable encoded image, and/or providing the replacement electronic message, which includes the replacement scannable encoded image, toward the recipient may reduce the amount of time and/or resources that is consumed by a computing system to identify, mitigate, or prevent the malicious attack with regard to the electronic message or electronic form that includes the scannable encoded image. By reducing the amount of time and/or resources that is consumed, the efficiency of the computing system may be increased.

The example techniques may increase a user experience of a user who scans the replacement scannable encoded image. For instance, by scanning the replacement scannable encoded image in the replacement electronic message or replacement electronic form rather than the scannable encoded image that was included in the electronic message or electronic form, a likelihood of the user being a victim of a malicious attack may be reduced. Accordingly, the example time-of-scan protection techniques described herein may increase security of the user. The example techniques may increase an efficiency of the user by reducing an amount of time and effort that the user otherwise may have consumed to address a malicious attack that was not detected at delivery time (e.g., due to the scannable encoded image not yet being weaponized).

FIG. 1 is a block diagram of an example time-of-scan protection system 100 in accordance with an embodiment. Generally speaking, the time-of-scan protection system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the time-of-scan protection system 100 provides time-of-scan protection for a scannable encoded image in an electronic message or an electronic form. Detail regarding techniques for providing time-of-scan protection for a scannable encoded image in an electronic message or an electronic form is provided in the following discussion.

As shown in FIG. 1, the time-of-scan protection system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes at least a portion of a processor system such that the portion of the processor system includes at least one processor that is capable of manipulating data in accordance with a set of instructions. A processor system includes one or more processors, which may be on a same (e.g., single) device or distributed among multiple (e.g., separate) devices. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the complex expression-based metadata generation system 100.

One example type of computer program that may be executed by one or more of the servers 106A-106N is a computer security program. A computer security program is a computer program that provides security with regard to information and/or communications associated with a computing system. For instance, the information associated with the computing system may include information stored on the computing system and/or information accessed (e.g., read) by the computing system, such as an electronic form. The communications associated with the computing system may include communications received by the computing system and/or communications provided (e.g., transmitted) by the computing system. An example of a communication is an electronic message. Examples of a computer security program include Bitdefender® security program, developed and distributed by Bitdefender IPR Management Ltd.; Norton® security program, developed and distributed by Gen Digital Inc.; Avast® security program, developed and distributed by Avast Software S.R.O.; McAfee® security program, developed and distributed by McAfee, LLC; and Microsoft Defender® security program, developed and distributed by Microsoft Corporation. It will be recognized that the example techniques described herein may be implemented using a computer security program.

The first server(s) 106A are shown to include time-of-scan protection logic 108 for illustrative purposes. The time-of-scan protection logic 108 is configured to provide time-of-scan protection for a scannable encoded image in an electronic message or an electronic form. In a first example implementation, the time-of-scan protection logic 108 receives an electronic message that is directed to a recipient. The electronic message includes a scannable encoded image. The time-of-scan protection logic 108 identifies a uniform resource identifier that is encoded in the scannable encoded image by decoding the scannable encoded image. The uniform resource identifier identifies a target data source. The time-of-scan protection logic 108 generates a wrapped uniform resource identifier by wrapping the uniform resource identifier in a wrapper. The wrapped uniform resource identifier identifies a substitute data source that is different from the target data source. The time-of-scan protection logic 108 generates a replacement scannable encoded image by encoding the wrapped uniform resource identifier. The time-of-scan protection logic 108 generates a replacement electronic message by replacing the scannable encoded image in the electronic message with the replacement scannable encoded image. The time-of-scan protection logic 108 provides the replacement electronic message, which includes the replacement scannable encoded image, toward the recipient.

In a second example implementation, the time-of-scan protection logic 108 receives an electronic form that is to be published in a cloud environment. The electronic form includes a scannable encoded image. The time-of-scan protection logic 108 identifies a uniform resource identifier that is encoded in the scannable encoded image by decoding the scannable encoded image. The uniform resource identifier identifies a target data source. The time-of-scan protection logic 108 generates a wrapped uniform resource identifier by wrapping the uniform resource identifier in a wrapper. The wrapped uniform resource identifier identifies a substitute data source that is different from the target data source. The time-of-scan protection logic 108 generates a replacement scannable encoded image by encoding the wrapped uniform resource identifier. The time-of-scan protection logic 108 generates a replacement electronic form by replacing the scannable encoded image in the electronic form with the replacement scannable encoded image. The time-of-scan protection logic 108 publishes the replacement electronic form, which includes the replacement scannable encoded image, in the cloud environment.

It will be recognized that a scannable encoded image need not necessarily be included in an electronic message or an electronic form. For example, the scannable encoded image may be included in an electronic document that is shared (or attempted to be shared) with a recipient by a sender. If the electronic document does not constitute an electronic message or an electronic form, a replacement electronic document that includes a replacement scannable encoded image, which replaces the scannable encoded image, may be generated in accordance with any one or more of the example techniques described herein. For instance, the scannable encoded image may be analyzed at scan time of the scannable encoded image to determine that the scannable encoded image is to be replaced with the replacement scannable encoded image. A uniform resource identifier that is encoded in the scannable encoded image may be identified; a wrapped uniform resource identifier may be generated by wrapping the uniform resource identifier in a wrapper; the replacement scannable encoded image may be generated by encoding the wrapped uniform resource identifier; the replacement electronic document may be generated by replacing the scannable encoded image in the electronic document with the replacement scannable encoded image; and so on. In accordance with this example, the replacement electronic document (e.g., rather than the electronic document) may be shared with the recipient.

The time-of-scan protection logic 108 may be implemented in various ways to provide time-of-scan protection for a scannable encoded image in an electronic message or an electronic form, including being implemented in hardware, software, firmware, or any combination thereof. For example, the time-of-scan protection logic 108 may be implemented as computer program code configured to be executed in one or more processors. In another example, at least a portion of the time-of-scan protection logic 108 may be implemented as hardware logic/electrical circuitry. For instance, at least a portion of the time-of-scan protection logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the time-of-scan protection logic 108 may be (or may be included in) a computer security program, though the scope of the example embodiments is not limited in this respect.

The time-of-scan protection logic 108 is shown to be incorporated in the first server(s) 106A for illustrative purposes and is not intended to be limiting. It will be recognized that the time-of-scan protection logic 108 (or any portion(s) thereof) may be incorporated in any one or more of the servers 106A-106N, any one or more of the user devices 102A-102M, or any combination thereof. For example, client-side aspects of the time-of-scan protection logic 108 may be incorporated in one or more of the user devices 102A-102M, and server-side aspects of time-of-scan protection logic 108 may be incorporated in one or more of the servers 106A-106N.

Figure 5:
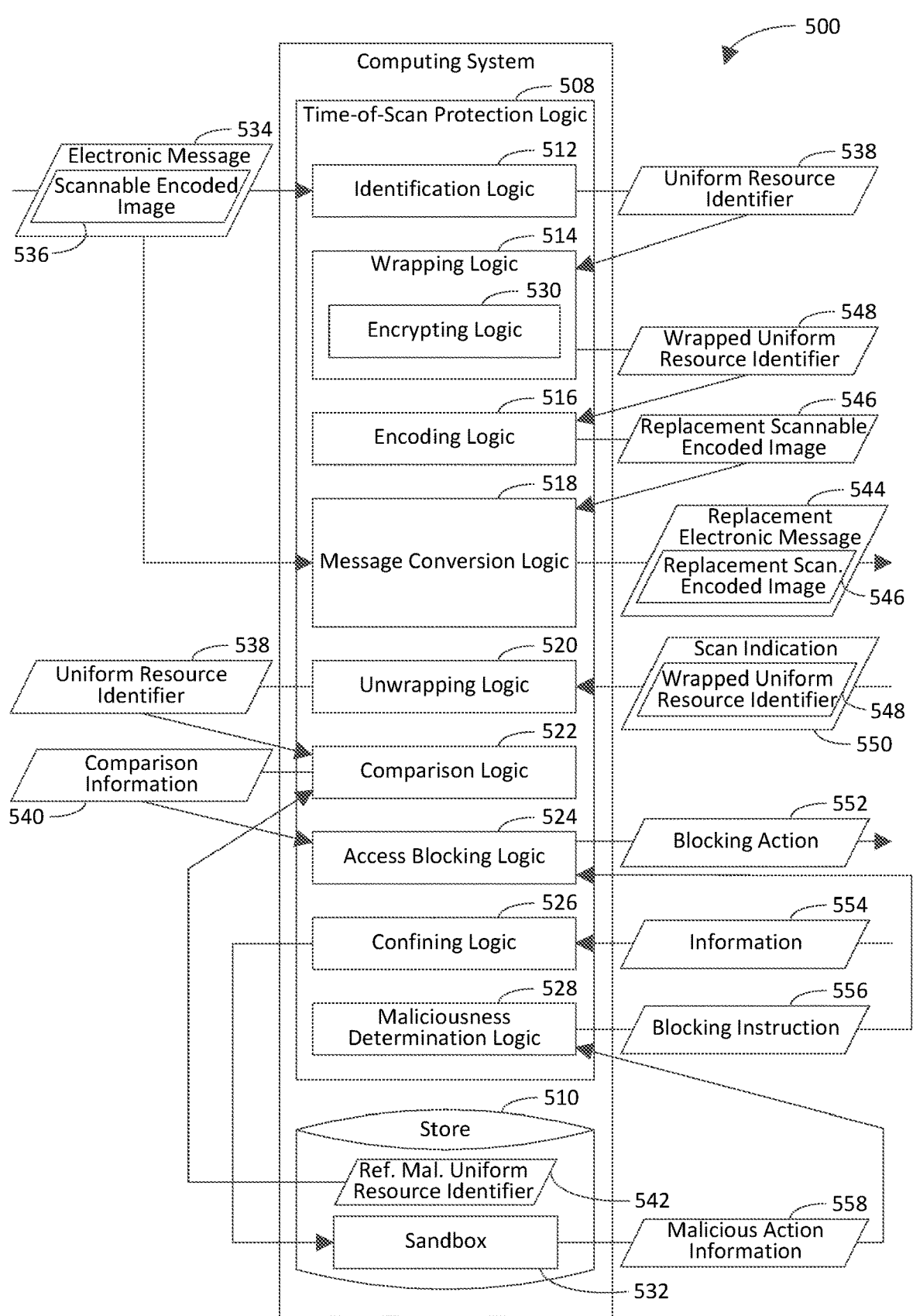
FIG. 5 is a block diagram of an example computing system in accordance with an embodiment.

FIG. 2 depicts a flowchart 200 of an example method for providing time-of-scan protection for a scannable encoded image in an electronic message in accordance with an embodiment. FIGS. 3-4 depict flowcharts of example methods for providing time-of-scan protection for a scannable encoded image in an electronic message or an electronic form in accordance with embodiments. Flowcharts 200, 300, and 400 may be performed by the first server(s) 106A shown in FIG. 1, for example. For illustrative purposes, flowcharts 200, 300, and 400 are described with respect to a computing system 500 shown in FIG. 5, which is an example implementation of the first server(s) 106A. As shown in FIG. 5, the computing system 500 includes time-of-scan protection logic 508 and a store 510. The time-of-scan protection logic 508 includes identification logic 512, wrapping logic 514, encoding logic 516, message conversion logic 518, unwrapping logic 520, comparison logic 522, access blocking logic 524, confining logic 526, and maliciousness determination logic 528. The wrapping logic 514 includes encrypting logic 530. The store 510 may be any suitable type of store. One type of store is a database. For instance, the store 510 may be a relational database, an entity-relationship database, an object database, an object relational database, an extensible markup language (XML) database, etc. The store 510 is shown to store a reference malicious uniform resource identifier 542 for non-limiting, illustrative purposes. The store 510 is further shown to include a sandbox 532. A sandbox is a region in a store (e.g., store 510) that is isolated from other regions in the store. In an aspect, the sandbox is a virtual container in which untrusted (e.g., malicious or potentially malicious) software programs can be safely executed. In accordance with this aspect, the sandbox is configured to detect when an untrusted software program performs a malicious operation in the virtual container. For instance, a software program can run in the sandbox without negatively impacting software programs that run outside the sandbox and/or without negatively impacting data that is stored outside the sandbox. Further structural and operational embodiments will be apparent to persons skilled in the relevant art(s) based on the discussion regarding flowcharts 200, 300, and 400.

As shown in FIG. 2, the method of flowchart 200 begins at step 202. In step 202, an electronic message that is directed to a recipient is received. The electronic message includes a scannable encoded image. In an aspect, the scannable encoded image is included (e.g., embedded) in a body of the electronic message. For instance, the scannable encoded image may be in-line with text in the body of the electronic message. In another aspect, the scannable encoded image is included (e.g., embedded) in an attachment (e.g., a document) that is attached to the electronic message. In accordance with this aspect, the attachment may be analyzed (e.g., along with the body of the electronic message) to identify the scannable encoded image. In yet another aspect, the electronic message is intercepted during transmission between a sender of the electronic message and the recipient. In accordance with this aspect, the electronic message is intercepted at delivery time. Delivery time of an electronic message is a time at which the electronic message is delivered (or attempted to be delivered) to a recipient. In an example implementation, the identification logic 512 receives an electronic message 534 that is directed to the recipient. The electronic message 534 includes a scannable encoded image 536.

At step 204, a uniform resource identifier that is encoded in the scannable encoded image is identified by decoding the scannable encoded image. The uniform resource identifier identifies a target data source. In an example implementation, the identification logic 512 identifies a uniform resource identifier 538 that is encoded in the scannable encoded image 536 by decoding the scannable encoded image 536. The uniform resource identifier 538 identifies the target data source.

At step 206, a wrapped uniform resource identifier is generated by wrapping the uniform resource identifier in a wrapper. The wrapped uniform resource identifier identifies a substitute data source that is different from the target data source. In an aspect, metadata is generated to indicate that the uniform resource identifier is associated with (e.g., derived from) the scannable encoded image. In accordance with this aspect, the metadata is associated with the wrapped uniform resource identifier. In an example implementation, wrapping logic 514 generates a wrapped uniform resource identifier 548 by wrapping the uniform resource identifier 538 in a wrapper. The wrapped uniform resource identifier 548 identifies the substitute data source, which is different from the target data source.

At step 208, a replacement scannable encoded image is generated by encoding the wrapped uniform resource identifier. In an example implementation, the encoding logic 516 generates a replacement scannable encoded image 546 by encoding the wrapped uniform resource identifier 548.

At step 210, a replacement electronic message is generated by replacing the scannable encoded image in the electronic message with the replacement scannable encoded image. In an example implementation, the message conversion logic 518 generates a replacement electronic message 544 by replacing the scannable encoded image 536 in the electronic message 534 with the replacement scannable encoded image 546.

At step 212, the replacement electronic message, which includes the replacement scannable encoded image, is provided toward the recipient. For example, the replacement electronic message may include the replacement scannable encoded image in lieu of the scannable encoded image. In an example implementation, the message conversion logic 518 provides the replacement electronic message 544, which includes the replacement scannable encoded image 546, toward the recipient.

In an example embodiment, providing the replacement electronic message toward the recipient at step 212 includes not providing the electronic message, which includes the scannable encoded image, toward the recipient.

In another example embodiment, the replacement electronic message is provided at step 212 toward a plurality of recipients simultaneously. In an aspect of this embodiment, the electronic message identifies the plurality of recipients. In accordance with this aspect, the scannable encoded image is replaced with the replacement scannable encoded image at step 210 simultaneously in a plurality of instances of the electronic message that are to be sent to the plurality of respective recipients.

In some example embodiments, one or more steps 202, 204, 206, 208, 210, and/or 212 of flowchart 200 may not be performed. Moreover, steps in addition to or in lieu of steps 202, 204, 206, 208, 210, and/or 212 may be performed. For instance, in an example embodiment, the method of flowchart 200 further includes encrypting the uniform resource identifier to provide an encrypted version of the uniform resource identifier. In an example implementation, the encrypting logic 530 encrypts the uniform resource identifier 538 to provide an encrypted version of the uniform resource identifier 538. In accordance with this embodiment, generating the wrapped uniform resource identifier at step 206 includes wrapping the encrypted version of the uniform resource identifier in the wrapper. In an example implementation, the wrapping logic 514 generates the wrapped uniform resource identifier 548 by wrapping the encrypted version of the uniform resource identifier 538 in the wrapper.

In an aspect of this embodiment, encrypting the uniform resource identifier obfuscates the uniform resource identifier in the encrypted version of the uniform resource identifier. Obfuscating the uniform resource identifier may prevent the uniform resource identifier from being derived from the encrypted version of the uniform resource identifier without decrypting the encrypted version of the uniform resource identifier.

In another example embodiment, the method of flowchart 200 further includes one or more of the steps shown in flowchart 300 of FIG. 3. As shown in FIG. 3, the method of flowchart 300 begins at step 302. In step 302, the wrapped uniform resource identifier is received from a second computing system. For instance, the wrapped uniform resource identifier may be received from the second computing system as a result of the replacement electronic message being provided at step 212. In an aspect, receiving the wrapped uniform resource identifier from the second computing system at step 302 is based at least on (e.g., in response to or as a result of) the replacement scannable encoded image being scanned by the second computing system. For instance, receipt of the wrapped uniform resource identifier at step 302 may be triggered by the replacement scannable encoded image being scanned by the second computing system. In an example implementation, the unwrapping logic 520 receives the wrapped uniform resource identifier 548 from the second computing system.

In an aspect of this embodiment, receiving the wrapped uniform resource identifier from the second computing system at step 302 includes receiving an indication that the replacement scannable encoded image is scanned by the second computing system The indication includes the wrapped uniform resource identifier. In an example implementation, the unwrapping logic 520 receives a scan indication 550, which indicates that the replacement scannable encoded image 546 has been scanned by the second computing system The scan indication 550 includes the wrapped uniform resource identifier 548.

At step 304, based at least on receipt of the wrapped uniform resource identifier from the second computing system, the uniform resource identifier is determined by unwrapping the wrapped uniform resource identifier. In an example implementation, based at least on receipt of the wrapped uniform resource identifier 548 from the second computing system, the unwrapping logic 520 determines the uniform resource identifier 548 by unwrapping the wrapped uniform resource identifier 548.

At step 306, a determination is made that the uniform resource identifier corresponds to (e.g., includes or is included in) a reference malicious uniform resource identifier by comparing the uniform resource identifier and the reference malicious uniform resource identifier. In an example implementation, the comparison logic 522 determines that the uniform resource identifier 538 corresponds to the reference malicious uniform resource identifier 542 by comparing the uniform resource identifier 538 and the reference malicious uniform resource identifier 542. For instance, the comparison logic 522 may retrieve the reference malicious uniform resource identifier 542 from the store 510 for comparison to the uniform resource identifier 538. The comparison logic 522 generates comparison information 540 to indicate whether the uniform resource identifier 538 corresponds to the reference malicious uniform resource identifier 542. For example, the comparison information 540 may include a binary flag associated with the comparison. In accordance with this example, the binary flag may be configured to have a first binary value (e.g., "1") based on the uniform resource identifier 538 corresponding to the reference malicious uniform resource identifier 542. In further accordance with this example, the binary flag may be configured to have a second binary value (e.g., "0") based on the uniform resource identifier 538 not corresponding to the reference malicious uniform resource identifier 542.

At step 308, access to the target data source is blocked based at least on the uniform resource identifier corresponding to the reference malicious uniform resource identifier. The target data source is identified by the uniform resource identifier. In an example implementation, the access blocking logic 524 performs a blocking action 525, which blocks access to the target data source that is identified by the uniform resource identifier 538, based at least on the uniform resource identifier 538 corresponding to the reference malicious uniform resource identifier 542. In an aspect, the access blocking logic 524 blocks the access to the target data source based at least on the comparison information 540 indicating that the uniform resource identifier 538 corresponds to the reference malicious uniform resource identifier 542. In accordance with this aspect, the access blocking logic 524 may block the access to the target data source further based at least on the target data source being identified by the uniform resource identifier 538. For instance, the comparison information 540, which is generated by the comparison logic 522, may further indicate the target data source.

In yet another example embodiment, the method of flowchart 200 further includes one or more of the steps shown in flowchart 400 of FIG. 4. As shown in FIG. 4, the method of flowchart 400 begins at step 402. In step 402, the wrapped uniform resource identifier is received from a second computing system. For instance, the wrapped uniform resource identifier may be received from the second computing system as a result of the replacement electronic message being provided at step 212. In an example implementation, the unwrapping logic 520 receives the wrapped uniform resource identifier 548 from the second computing system.

In an aspect of this embodiment, receiving the wrapped uniform resource identifier from the second computing system at step 402 includes receiving an indication that the replacement scannable encoded image is scanned by the second computing system The indication includes the wrapped uniform resource identifier. In an example implementation, the unwrapping logic 520 receives a scan indication 550, which indicates that the replacement scannable encoded image 546 has been scanned by the second computing system The scan indication 550 includes the wrapped uniform resource identifier 548.

At step 404, based at least on receipt of the wrapped uniform resource identifier from the second computing system, the uniform resource identifier is determined by unwrapping the wrapped uniform resource identifier. In an example implementation, based at least on receipt of the wrapped uniform resource identifier 548 from the second computing system, the unwrapping logic 520 determines the uniform resource identifier 548 by unwrapping the wrapped uniform resource identifier 548.

At step 406, information is confined in a sandbox. The information is received from the target data source using the uniform resource indicator based at least on the wrapped uniform resource identifier being unwrapped. In an example implementation, the confining logic 526 confines information 554 in the sandbox 532. The information 554 is received from the target data source using the uniform resource indicator 538 based at least on the wrapped uniform resource identifier 548 being unwrapped.

At step 408, a determination is made that the uniform resource identifier is a malicious uniform resource identifier based at least on a malicious action (e.g., a phishing attack) being initiated within the sandbox as a result of the information being confined in the sandbox. In an example implementation, the maliciousness determination logic 528 determines that the uniform resource identifier 538 is a malicious uniform resource identifier based at least on a malicious action being initiated within the sandbox 532 as a result of the information 554 being confined in the sandbox 532. In an aspect, the maliciousness determination logic 528 receives malicious action information 558 from the sandbox 532. In accordance with this aspect, the malicious action information 558 indicates that the malicious action was initiated within the sandbox 532. For instance, the confining logic 526 may cause the malicious action to be initiated within the sandbox 532 by opening (e.g., asynchronously opening) the uniform resource identifier 538 (e.g., accessing information from the target data source that is identified by the uniform resource identifier 538) in the sandbox 532. Based at least on the maliciousness determination logic 528 determining that the uniform resource identifier 538 is a malicious uniform resource identifier, the maliciousness determination logic 528 generates a blocking instruction 556, which instructs the access blocking logic 524 to block access to the target data source outside the sandbox.

At step 410, access to the target data source outside the sandbox is blocked based at least on determining that the uniform resource identifier is the malicious uniform resource identifier. In an example implementation, the access blocking logic 524 performs a blocking action 525, which blocks access to the target data source outside the sandbox, based at least on a determination that the uniform resource identifier is the malicious uniform resource identifier. In an aspect, the access blocking logic 524 performs the blocking action 525 based at least on receipt of the blocking instruction 556 (e.g., based at least on the blocking instruction 556 instructing the access blocking logic 524 to block the access to the target data source outside the sandbox).

It will be recognized that the computing system 500 may not include one or more of the time-of-scan protection logic 508, the store 510, the identification logic 512, the wrapping logic 514, the encoding logic 516, the message conversion logic 518, the unwrapping logic 520, the comparison logic 522, the access blocking logic 524, the confining logic 526, the maliciousness determination logic 528, the encrypting logic 530, and/or the sandbox 532. Furthermore, the computing system 500 may include components in addition to or in lieu of the time-of-scan protection logic 508, the store 510, the identification logic 512, the wrapping logic 514, the encoding logic 516, the message conversion logic 518, the unwrapping logic 520, the comparison logic 522, the access blocking logic 524, the confining logic 526, the maliciousness determination logic 528, the encrypting logic 530, and/or the sandbox 532.

Figure 7:
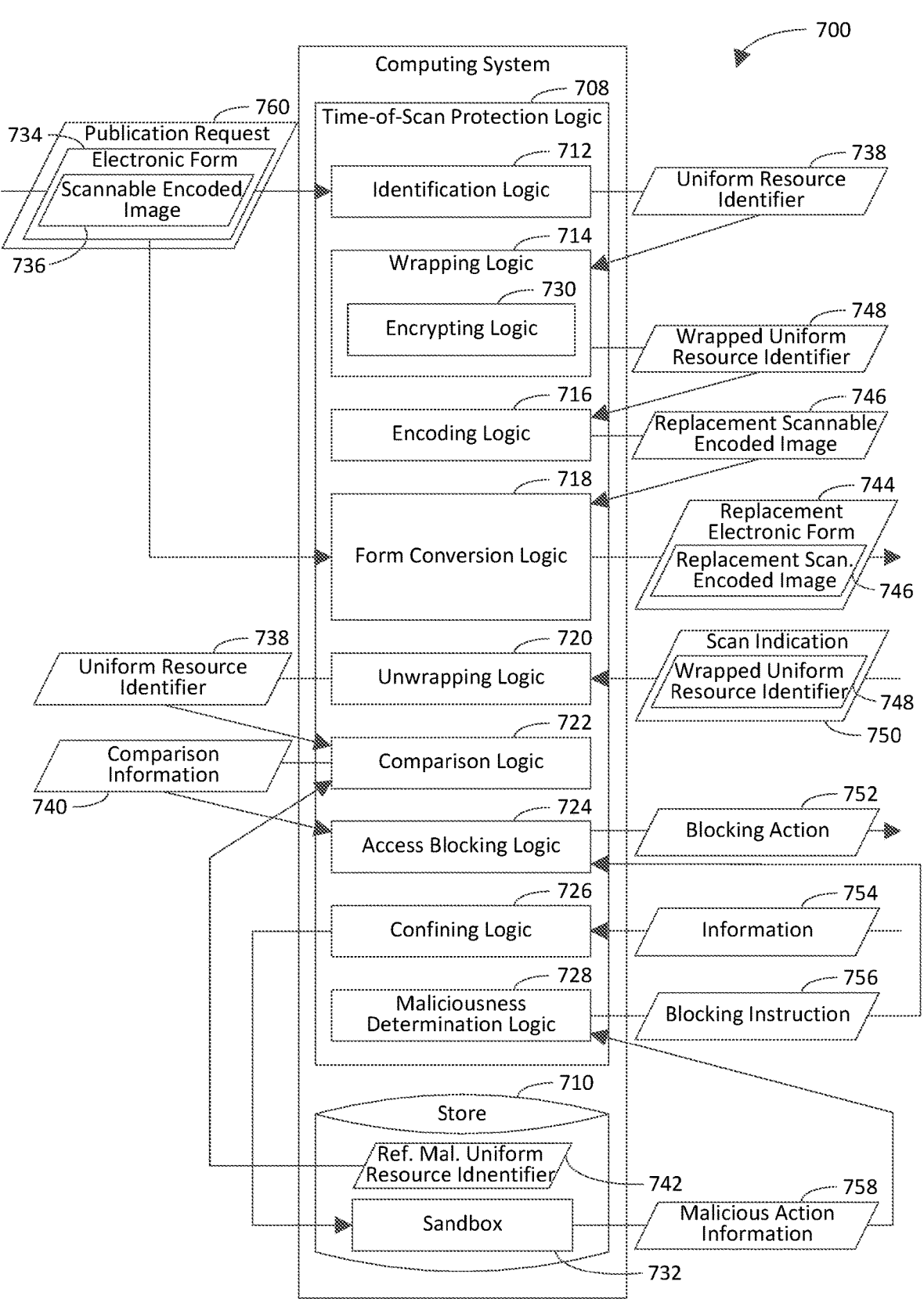
FIG. 7 is a block diagram of another example computing system in accordance with an embodiment.

FIG. 6 depicts a flowchart 600 of an example method for providing time-of-scan protection for a scannable encoded image in an electronic form in accordance with an embodiment. Flowchart 600 may be performed by the first server(s) 106A shown in FIG. 1, for example. For illustrative purposes, flowchart 600 is described with respect to a computing system 700 shown in FIG. 7, which is an example implementation of the first server(s) 106A. As shown in FIG. 7, the computing system 700 includes time-of-scan protection logic 708 and a store 710. The time-of-scan protection logic 708 includes identification logic 712, wrapping logic 714, encoding logic 716, form conversion logic 718, unwrapping logic 720, comparison logic 722, access blocking logic 724, confining logic 726, and maliciousness determination logic 728. The wrapping logic 714 includes encrypting logic 730. The store 710 may be any suitable type of store. One type of store is a database. For instance, the store 710 may be a relational database, an entity-relationship database, an object database, an object relational database, an extensible markup language (XML) database, etc. The store 710 is shown to store a reference malicious uniform resource identifier 742 for non-limiting, illustrative purposes. The store 710 is further shown to include a sandbox 732. Further structural and operational embodiments will be apparent to persons skilled in the relevant art(s) based on the discussion regarding flowchart 600.

As shown in FIG. 6, the method of flowchart 600 begins at step 602. In step 602, an electronic form that is to be published in a cloud environment is received. The electronic form includes a scannable encoded image. In an aspect, the electronic form is received at publication time of the electronic form. Publication time of an electronic form is a time at which the electronic form is published (or attempted to be published). For instance, the electronic form may be received at publication time prior to publication of the electronic form (e.g., during an unsuccessful attempt to publish the electronic form). In an example implementation, the identification logic 712 receives an electronic form 734 that is to be published in the cloud environment. The electronic form 734 includes a scannable encoded image 736.

At step 604, a uniform resource identifier that is encoded in the scannable encoded image is identified by decoding the scannable encoded image. The uniform resource identifier identifies a target data source. In an example implementation, the identification logic 712 identifies a uniform resource identifier 738 that is encoded in the scannable encoded image 736 by decoding the scannable encoded image 736. The uniform resource identifier 738 identifies the target data source.

At step 606, a wrapped uniform resource identifier is generated by wrapping the uniform resource identifier in a wrapper. The wrapped uniform resource identifier identifies a substitute data source that is different from the target data source. In an example implementation, wrapping logic 714 generates a wrapped uniform resource identifier 748 by wrapping the uniform resource identifier 738 in a wrapper. The wrapped uniform resource identifier 748 identifies the substitute data source, which is different from the target data source.

At step 608, a replacement scannable encoded image is generated by encoding the wrapped uniform resource identifier. In an example implementation, the encoding logic 716 generates a replacement scannable encoded image 746 by encoding the wrapped uniform resource identifier 748.

At step 610, a replacement electronic form is generated by replacing the scannable encoded image in the electronic form with the replacement scannable encoded image. In an example implementation, the form conversion logic 718 generates a replacement electronic form 744 by replacing the scannable encoded image 736 in the electronic form 734 with the replacement scannable encoded image 746.

At step 612, the replacement electronic form, which includes the replacement scannable encoded image, is published in the cloud environment. In an example implementation, the form conversion logic 718 publishes the replacement electronic form 744, which includes the replacement scannable encoded image 746, in the cloud environment.

In an example embodiment, publishing the replacement electronic form at step 612 includes not publishing the electronic form, which includes the scannable encoded image, in the cloud environment.

In another example embodiment, receiving the electronic form at step 602 includes receiving a request to publish the electronic form in the cloud environment. In an example implementation, the identification logic 712 receives a publication request 760, which requests to publish the electronic form 734 in the cloud environment. In an aspect, the publication request 760 includes the electronic form 734. In accordance with this embodiment, publishing the replacement electronic form at step 612 includes, based at least on receipt of the request to publish the electronic form, publishing the replacement electronic form, which includes the replacement scannable encoded image, in lieu of the electronic form, which includes the scannable encoded image. In an example implementation, based at least on receipt of the publication request 760, the form conversion logic 718 publishes the replacement electronic form 744, which includes the replacement scannable encoded image 746, in lieu of the electronic form 734, which includes the scannable encoded image 736.

In some example embodiments, one or more steps 602, 604, 606, 608, 610, and/or 612 of flowchart 600 may not be performed. Moreover, steps in addition to or in lieu of steps 602, 604, 606, 608, 610, and/or 612 may be performed. For instance, in an example embodiment, the method of flowchart 600 further includes encrypting the uniform resource identifier to provide an encrypted version of the uniform resource identifier. In an example implementation, the encrypting logic 730 encrypts the uniform resource identifier 738 to provide an encrypted version of the uniform resource identifier 738. In accordance with this embodiment, generating the wrapped uniform resource identifier at step 606 includes wrapping the encrypted version of the uniform resource identifier in the wrapper. In an example implementation, the wrapping logic 714 generates the wrapped uniform resource identifier 748 by wrapping the encrypted version of the uniform resource identifier 738 in the wrapper.

In an aspect of this embodiment, encrypting the uniform resource identifier obfuscates the uniform resource identifier in the encrypted version of the uniform resource identifier. Obfuscating the uniform resource identifier may prevent the uniform resource identifier from being derived from the encrypted version of the uniform resource identifier without decrypting the encrypted version of the uniform resource identifier.

In another example embodiment, the method of flowchart 600 further includes one or more of the steps shown in flowchart 300 of FIG. 3, which is described in detail above. In an aspect of this embodiment, the wrapped uniform resource identifier is received from the second computing system at step 302 as a result of the replacement electronic form being published in the cloud environment at step 612.

In yet another example embodiment, the method of flowchart 600 further includes one or more of the steps shown in flowchart 400 of FIG. 4, which is described in detail above. In an aspect of this embodiment, the wrapped uniform resource identifier is received from the second computing system at 402 as a result of the replacement electronic form being published in the cloud environment at step 612.

The steps of flowcharts 300 and 400 are described above as being performed by the elements shown in the computing system 500 of FIG. 5 in accordance with example implementations. It will be recognized that the steps of flowcharts 300 and 400 may be performed by the elements shown in the computing system 700 of FIG. 7 in accordance with example implementations.

For instance, descriptions of flowcharts 300 and 400 that reference the time-of-scan protection logic 508, the store 510, the identification logic 512, the wrapping logic 514, the encoding logic 516, the message conversion logic 518, the unwrapping logic 520, the comparison logic 522, the access blocking logic 524, the confining logic 526, the maliciousness determination logic 528, the encrypting logic 530, the sandbox 532, the electronic message 534, the scannable encoded image 536, the uniform resource identifier 538, the comparison information 540, the reference malicious uniform resource identifier 542, the replacement electronic message 544, the replacement scannable encoded image 546, the wrapped uniform resource identifier 548, the scan indication 550, the blocking action 552, the information 554, the blocking instruction 556, and/or the malicious action information 558 shown in FIG. 5 are applicable to the time-of-scan protection logic 708, the store 710, the identification logic 712, the wrapping logic 714, the encoding logic 716, the form conversion logic 718, the unwrapping logic 720, the comparison logic 722, the access blocking logic 724, the confining logic 726, the maliciousness determination logic 728, the encrypting logic 730, the sandbox 732, the electronic form 734, the scannable encoded image 736, the uniform resource identifier 738, the comparison information 740, the reference malicious uniform resource identifier 742, the replacement electronic form 744, the replacement scannable encoded image 746, the wrapped uniform resource identifier 748, the scan indication 750, the blocking action 752, the information 754, the blocking instruction 756, and/or the malicious action information 758, respectively, shown in FIG. 7.

It will be recognized that the computing system 700 may not include one or more of the time-of-scan protection logic 708, the store 710, the identification logic 712, the wrapping logic 714, the encoding logic 716, the form conversion logic 718, the unwrapping logic 720, the comparison logic 722, the access blocking logic 724, the confining logic 726, the maliciousness determination logic 728, the encrypting logic 730, and/or the sandbox 732. Furthermore, the computing system 500 may include components in addition to or in lieu of the time-of-scan protection logic 708, the store 710, the identification logic 712, the wrapping logic 714, the encoding logic 716, the form conversion logic 718, the unwrapping logic 720, the comparison logic 722, the access blocking logic 724, the confining logic 726, the maliciousness determination logic 728, the encrypting logic 730, and/or the sandbox 732.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the time-of-scan protection logic 108, the time-of-scan protection logic 508, the store 510, the identification logic 512, the wrapping logic 514, the encoding logic 516, the message conversion logic 518, the unwrapping logic 520, the comparison logic 522, the access blocking logic 524, the confining logic 526, the maliciousness determination logic 528, the encrypting logic 530, the sandbox 532, the time-of-scan protection logic 708, the store 710, the identification logic 712, the wrapping logic 714, the encoding logic 716, the form conversion logic 718, the unwrapping logic 720, the comparison logic 722, the access blocking logic 724, the confining logic 726, the maliciousness determination logic 728, the encrypting logic 730, the sandbox 732, flowchart 200, flowchart 300, flowchart 400, and/or flowchart 600 may be implemented in hardware, software, firmware, or any combination thereof.

For example, any one or more of the time-of-scan protection logic 108, the time-of-scan protection logic 508, the store 510, the identification logic 512, the wrapping logic 514, the encoding logic 516, the message conversion logic 518, the unwrapping logic 520, the comparison logic 522, the access blocking logic 524, the confining logic 526, the maliciousness determination logic 528, the encrypting logic 530, the sandbox 532, the time-of-scan protection logic 708, the store 710, the identification logic 712, the wrapping logic 714, the encoding logic 716, the form conversion logic 718, the unwrapping logic 720, the comparison logic 722, the access blocking logic 724, the confining logic 726, the maliciousness determination logic 728, the encrypting logic 730, the sandbox 732, flowchart 200, flowchart 300, flowchart 400, and/or flowchart 600 may be implemented, at least in part, as computer program code configured to be executed in one or more processors.

In another example, any one or more of the time-of-scan protection logic 108, the time-of-scan protection logic 508, the store 510, the identification logic 512, the wrapping logic 514, the encoding logic 516, the message conversion logic 518, the unwrapping logic 520, the comparison logic 522, the access blocking logic 524, the confining logic 526, the maliciousness determination logic 528, the encrypting logic 530, the sandbox 532, the time-of-scan protection logic 708, the store 710, the identification logic 712, the wrapping logic 714, the encoding logic 716, the form conversion logic 718, the unwrapping logic 720, the comparison logic 722, the access blocking logic 724, the confining logic 726, the maliciousness determination logic 728, the encrypting logic 730, the sandbox 732, flowchart 200, flowchart 300, flowchart 400, and/or flowchart 600 may be implemented, at least in part, as hardware logic/electrical circuitry. Such hardware logic/electrical circuitry may include one or more hardware logic components. Examples of a hardware logic component include a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
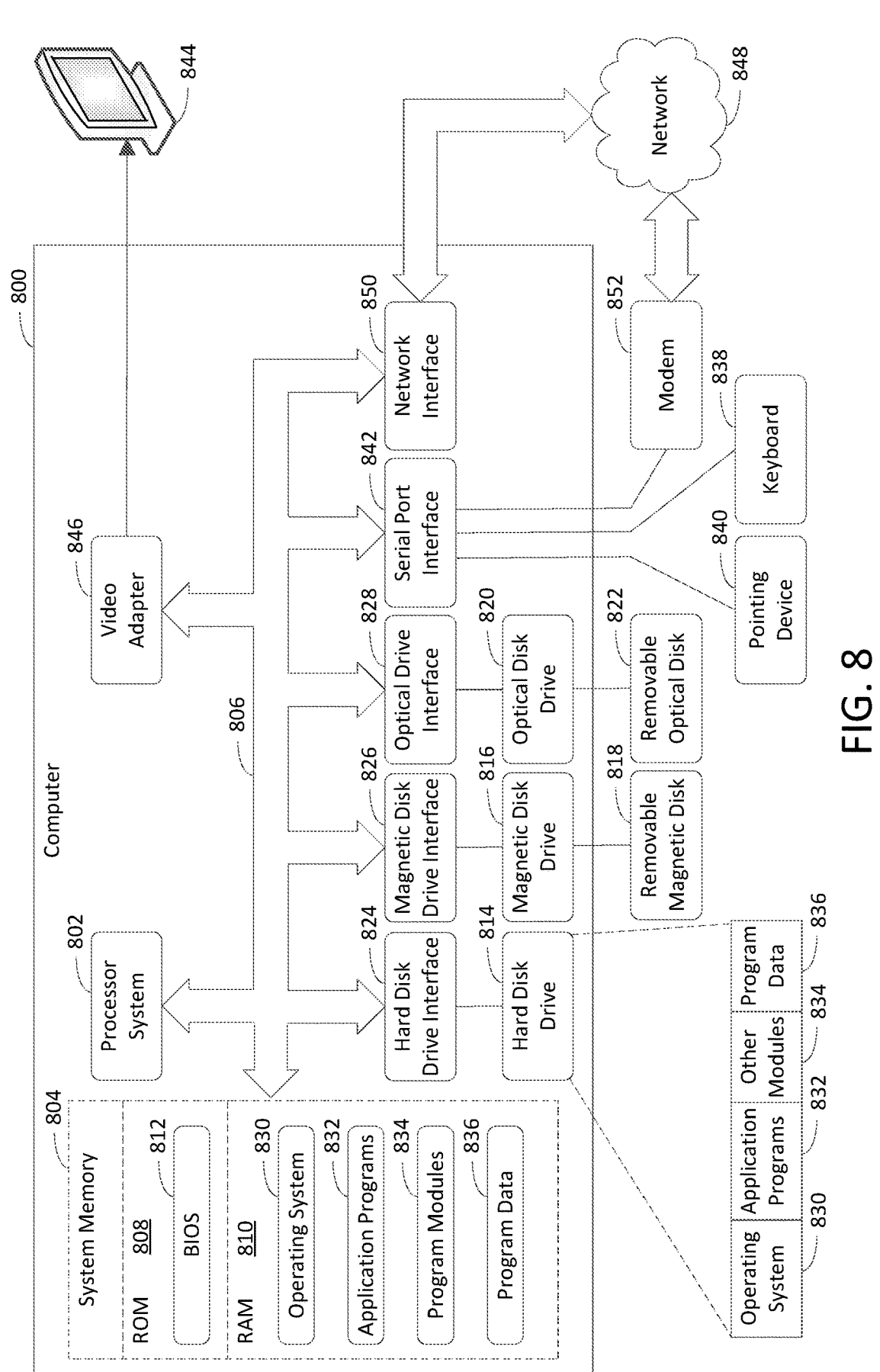
FIG. 8 depicts an example computer in which embodiments may be implemented.

II. Further Discussion of Some Example Embodiments (A1) A first example computing system (FIG. 1, 102A-102M, 106A-106N; FIG. 5, 500; FIG. 8, 800) comprises a processor system (FIG. 8, 802) and a memory (FIG. 8, 804, 808, 810) that stores computer-executable instructions. The computer-executable instructions are executable by the processor system to at least receive (FIG. 2, 202) an electronic message (FIG. 5, 534) that is directed to a recipient. The electronic message includes a scannable encoded image (FIG. 5, 536). The computer-executable instructions are executable by the processor system further to at least identify (FIG. 2, 204) a uniform resource identifier (FIG. 5, 538) that is encoded in the scannable encoded image by decoding the scannable encoded image. The uniform resource identifier identifies a target data source. The computer-executable instructions are executable by the processor system further to at least generate (FIG. 2, 206) a wrapped uniform resource identifier (FIG. 5, 548) by wrapping the uniform resource identifier in a wrapper. The wrapped uniform resource identifier identifies a substitute data source that is different from the target data source. The computer-executable instructions are executable by the processor system further to at least generate (FIG. 2, 208) a replacement scannable encoded image (FIG. 5, 546) by encoding the wrapped uniform resource identifier. The computer-executable instructions are executable by the processor system further to at least generate (FIG. 2, 210) a replacement electronic message (FIG. 5, 544) by replacing the scannable encoded image in the electronic message with the replacement scannable encoded image. The computer-executable instructions are executable by the processor system further to at least provide (FIG. 2, 212) the replacement electronic message, which includes the replacement scannable encoded image, toward the recipient.

(A2) In the first example computing system of A1, wherein the computer-executable instructions are executable by the processor system to: provide the replacement electronic message, which includes the replacement scannable encoded image in lieu of the scannable encoded image, toward the recipient.

(A3) In the first example computing system of any of A1-A2, wherein the computer-executable instructions are executable by the processor system further to: not provide the electronic message, which includes the scannable encoded image, toward the recipient.

(A4) In the first example computing system of any of A1-A3, wherein the computer-executable instructions are executable by the processor system to: encrypt the uniform resource identifier to provide an encrypted version of the uniform resource identifier; and generate the wrapped uniform resource identifier by wrapping the encrypted version of the uniform resource identifier in the wrapper.

(A5) In the first example computing system of any of A1-A4, wherein the computer-executable instructions are executable by the processor system further to: as a result of the replacement electronic message being provided, receive the wrapped uniform resource identifier from a second computing system; based at least on receipt of the wrapped uniform resource identifier from the second computing system, determine the uniform resource identifier by unwrapping the wrapped uniform resource identifier; determine that the uniform resource identifier corresponds to a reference malicious uniform resource identifier by comparing the uniform resource identifier and the reference malicious uniform resource identifier; and block access to the target data source, which is identified by the uniform resource identifier, based at least on the uniform resource identifier corresponding to the reference malicious uniform resource identifier.

(A6) In the first example computing system of any of A1-A5, wherein the computer-executable instructions are executable by the processor system to: receive an indication that the replacement scannable encoded image is scanned by the second computing system, the indication including the wrapped uniform resource identifier.

(A7) In the first example computing system of any of A1-A6, wherein the computer-executable instructions are executable by the processor system further to: as a result of the replacement electronic message being provided, receive the wrapped uniform resource identifier from a second computing system; based at least on receipt of the wrapped uniform resource identifier from the second computing system, determine the uniform resource identifier by unwrapping the wrapped uniform resource identifier; confine information, which is received from the target data source using the uniform resource indicator based at least on the wrapped uniform resource identifier being unwrapped, in a sandbox; determine that the uniform resource identifier is a malicious uniform resource identifier based at least on a malicious action being initiated within the sandbox as a result of the information being confined in the sandbox; and block access to the target data source outside the sandbox based at least on determining that the uniform resource identifier is the malicious uniform resource identifier.

(A8) In the first example computing system of any of A1-A7, wherein the computer-executable instructions are executable by the processor system to: provide the replacement electronic message, which includes the replacement scannable encoded image, toward a plurality of recipients simultaneously.

(B1) A second example computing system (FIG. 1, 102A-102M, 106A-106N; FIG. 7, 700; FIG. 8, 800) comprises a processor system (FIG. 8, 802) and a memory (FIG. 8, 804, 808, 810) that stores computer-executable instructions. The computer-executable instructions are executable by the processor system to at least receive (FIG. 6, 602) an electronic form (FIG. 7, 734) that is to be published in a cloud environment. The electronic form includes a scannable encoded image (FIG. 7, 736). The computer-executable instructions are executable by the processor system further to at least identify (FIG. 6, 604) a uniform resource identifier (FIG. 7, 738) that is encoded in the scannable encoded image by decoding the scannable encoded image. The uniform resource identifier identifies a target data source. The computer-executable instructions are executable by the processor system further to at least generate (FIG. 6, 606) a wrapped uniform resource (FIG. 7, 748) identifier by wrapping the uniform resource identifier in a wrapper. The wrapped uniform resource identifier identifies a substitute data source that is different from the target data source. The computer-executable instructions are executable by the processor system further to at least generate (FIG. 6, 608) a replacement scannable encoded image (FIG. 7, 746) by encoding the wrapped uniform resource identifier. The computer-executable instructions are executable by the processor system further to at least generate (FIG. 6, 610) a replacement electronic form (FIG. 7, 744) by replacing the scannable encoded image in the electronic form with the replacement scannable encoded image. The computer-executable instructions are executable by the processor system further to at least publish (FIG. 6, 612) the replacement electronic form, which includes the replacement scannable encoded image, in the cloud environment.

(B2) In the second example computing system of B1, wherein the computer-executable instructions are executable by the processor system to: receive a request to publish the electronic form in the cloud environment; and based at least on receipt of the request to publish the electronic form, publish the replacement electronic form, which includes the replacement scannable encoded image, in lieu of the electronic form, which includes the scannable encoded image.

(B3) In the second example computing system of any of B1-B2, wherein the computer-executable instructions are executable by the processor system further to: not publish the electronic form, which includes the scannable encoded image, in the cloud environment.

(B4) In the second example computing system of any of B1-B3, wherein the computer-executable instructions are executable by the processor system to: encrypt the uniform resource identifier to provide an encrypted version of the uniform resource identifier; and generate the wrapped uniform resource identifier by wrapping the encrypted version of the uniform resource identifier in the wrapper.

(B5) In the second example computing system of any of B1-B4, wherein the computer-executable instructions are executable by the processor system further to: as a result of the replacement electronic form being published in the cloud environment, receive the wrapped uniform resource identifier from a second computing system; based at least on receipt of the wrapped uniform resource identifier from the second computing system, determine the uniform resource identifier by unwrapping the wrapped uniform resource identifier; determine that the uniform resource identifier corresponds to a reference malicious uniform resource identifier by comparing the uniform resource identifier and the reference malicious uniform resource identifier; and block access to the target data source, which is identified by the uniform resource identifier, based at least on the uniform resource identifier corresponding to the reference malicious uniform resource identifier.

(B6) In the second example computing system of any of B1-B5, wherein the computer-executable instructions are executable by the processor system to: receive an indication that the replacement scannable encoded image is scanned by the second computing system, the indication including the wrapped uniform resource identifier.

(B7) In the second example computing system of any of B1-B6, wherein the computer-executable instructions are executable by the processor system further to: as a result of the replacement electronic form being published in the cloud environment, receive the wrapped uniform resource identifier from a second computing system; based at least on receipt of the wrapped uniform resource identifier from the second computing system, determine the uniform resource identifier by unwrapping the wrapped uniform resource identifier; confine information, which is received from the target data source using the uniform resource indicator based at least on the wrapped uniform resource identifier being unwrapped, in a sandbox; determine that the uniform resource identifier is a malicious uniform resource identifier based at least on a malicious action being initiated within the sandbox as a result of the information being confined in the sandbox; and block access to the target data source outside the sandbox based at least on determining that the uniform resource identifier is the malicious uniform resource identifier.

(C1) A first example method is implemented by a computing system (FIG. 1, 102A-102M, 106A-106N; FIG. 5, 500; FIG. 8, 800). The method comprises receiving (FIG. 2, 202) an electronic message (FIG. 5, 534) that is directed to a recipient. The electronic message includes a scannable encoded image (FIG. 5, 536). The method further comprises identifying (FIG. 2, 204) a uniform resource identifier (FIG. 5, 538) that is encoded in the scannable encoded image by decoding the scannable encoded image. The uniform resource identifier identifies a target data source. The method further comprises generating (FIG. 2, 206) a wrapped uniform resource identifier (FIG. 5, 548) by wrapping the uniform resource identifier in a wrapper. The wrapped uniform resource identifier identifies a substitute data source that is different from the target data source. The method further comprises generating (FIG. 2, 208) a replacement scannable encoded image (FIG. 5, 546) by encoding the wrapped uniform resource identifier. The method further comprises generating (FIG. 2, 210) a replacement electronic message (FIG. 5, 544) by replacing the scannable encoded image in the electronic message with the replacement scannable encoded image. The method further comprises providing (FIG. 2, 212) the replacement electronic message, which includes the replacement scannable encoded image, toward the recipient.

(C2) In the first example method of C1, wherein providing the replacement electronic message toward the recipient comprises: providing the replacement electronic message, which includes the replacement scannable encoded image in lieu of the scannable encoded image, toward the recipient.

(C3) In the first example method of any of C1-C2, wherein providing the replacement electronic message toward the recipient comprises: not providing the electronic message, which includes the scannable encoded image, toward the recipient.

(C4) In the first example method of any of C1-C3, further comprising: encrypting the uniform resource identifier to provide an encrypted version of the uniform resource identifier; wherein generating the wrapped uniform resource identifier comprises: wrapping the encrypted version of the uniform resource identifier in the wrapper.

(C5) In the first example method of any of C1-C4, further comprising: as a result of providing the replacement electronic message, receiving the wrapped uniform resource identifier from a second computing system; based at least on receipt of the wrapped uniform resource identifier from the second computing system, determining the uniform resource identifier by unwrapping the wrapped uniform resource identifier; determining that the uniform resource identifier corresponds to a reference malicious uniform resource identifier by comparing the uniform resource identifier and the reference malicious uniform resource identifier; and blocking access to the target data source, which is identified by the uniform resource identifier, based at least on the uniform resource identifier corresponding to the reference malicious uniform resource identifier.

(C6) In the first example method of any of C1-C5, wherein receiving the wrapped uniform resource identifier from the second computing system comprises: receiving an indication that the replacement scannable encoded image is scanned by the second computing system, the indication including the wrapped uniform resource identifier.

(C7) In the first example method of any of C1-C6, further comprising: as a result of providing the replacement electronic message, receiving the wrapped uniform resource identifier from a second computing system; based at least on receipt of the wrapped uniform resource identifier from the second computing system, determining the uniform resource identifier by unwrapping the wrapped uniform resource identifier; confining information, which is received from the target data source using the uniform resource indicator based at least on the wrapped uniform resource identifier being unwrapped, in a sandbox; determining that the uniform resource identifier is a malicious uniform resource identifier based at least on a malicious action being initiated within the sandbox as a result of the information being confined in the sandbox; and blocking access to the target data source outside the sandbox based at least on determining that the uniform resource identifier is the malicious uniform resource identifier.

(C8) In the first example method of any of C1-C7, wherein providing the replacement electronic message comprises: providing the replacement electronic message, which includes the replacement scannable encoded image, toward a plurality of recipients simultaneously.

(D1) A second example method is implemented by a computing system (FIG. 1, 102A-102M, 106A-106N; FIG. 7, 700; FIG. 8, 800). The method comprises receiving (FIG. 6, 602) an electronic form (FIG. 7, 734) that is to be published in a cloud environment. The electronic form includes a scannable encoded image (FIG. 7, 736). The method further comprises identifying (FIG. 6, 604) a uniform resource identifier (FIG. 7, 738) that is encoded in the scannable encoded image by decoding the scannable encoded image. The uniform resource identifier identifies a target data source. The method further comprises generating (FIG. 6, 606) a wrapped uniform resource identifier (FIG. 7, 748) by wrapping the uniform resource identifier in a wrapper. The wrapped uniform resource identifier identifies a substitute data source that is different from the target data source. The method further comprises generating (FIG. 6, 608) a replacement scannable encoded image (FIG. 7, 746) by encoding the wrapped uniform resource identifier. The method further comprises generating (FIG. 6, 610) a replacement electronic form (FIG. 7, 744) by replacing the scannable encoded image in the electronic form with the replacement scannable encoded image. The method further comprises publishing (FIG. 6, 612) the replacement electronic form, which includes the replacement scannable encoded image, in the cloud environment.

(D2) In the second example method of D1, wherein receiving the electronic form comprises: receiving a request to publish the electronic form in the cloud environment; and wherein publishing the replacement electronic form comprises: based at least on receipt of the request to publish the electronic form, publishing the replacement electronic form, which includes the replacement scannable encoded image, in lieu of the electronic form, which includes the scannable encoded image.

(D3) In the second example method of any of D1-D2, wherein publishing the replacement electronic form comprises: not publishing the electronic form, which includes the scannable encoded image, in the cloud environment.

(D4) In the second example method of any of D1-D3, further comprising: encrypting the uniform resource identifier to provide an encrypted version of the uniform resource identifier; wherein generating the wrapped uniform resource identifier comprises: wrapping the encrypted version of the uniform resource identifier in the wrapper.

(D5) In the second example method of any of D1-D4, further comprising: as a result of publishing the replacement electronic form in the cloud environment, receiving the wrapped uniform resource identifier from a second computing system; based at least on receipt of the wrapped uniform resource identifier from the second computing system, determining the uniform resource identifier by unwrapping the wrapped uniform resource identifier; determining that the uniform resource identifier corresponds to a reference malicious uniform resource identifier by comparing the uniform resource identifier and the reference malicious uniform resource identifier; and blocking access to the target data source, which is identified by the uniform resource identifier, based at least on the uniform resource identifier corresponding to the reference malicious uniform resource identifier.

(D6) In the second example method of any of D1-D5, wherein receiving the wrapped uniform resource identifier from the second computing system comprises: receiving an indication that the replacement scannable encoded image is scanned by the second computing system, the indication including the wrapped uniform resource identifier.

(D7) In the second example method of any of D1-D6, further comprising: as a result of publishing the replacement electronic form in the cloud environment, receiving the wrapped uniform resource identifier from a second computing system; based at least on receipt of the wrapped uniform resource identifier from the second computing system, determining the uniform resource identifier by unwrapping the wrapped uniform resource identifier; confining information, which is received from the target data source using the uniform resource indicator based at least on the wrapped uniform resource identifier being unwrapped, in a sandbox; determining that the uniform resource identifier is a malicious uniform resource identifier based at least on a malicious action being initiated within the sandbox as a result of the information being confined in the sandbox; and blocking access to the target data source outside the sandbox based at least on determining that the uniform resource identifier is the malicious uniform resource identifier.

(E1) A first example computer program product (FIG. 8, 818, 822) comprising a computer-readable storage medium having instructions recorded thereon for enabling a processor-based system (FIG. 1, 102A-102M, 106A-106N; FIG. 5, 500; FIG. 8, 800) to perform operations. The operations comprise receiving (FIG. 2, 202) an electronic message (FIG. 5, 534) that is directed to a recipient. The electronic message includes a scannable encoded image (FIG. 5, 536). The operations further comprise identifying (FIG. 2, 204) a uniform resource identifier (FIG. 5, 538) that is encoded in the scannable encoded image by decoding the scannable encoded image. The uniform resource identifier identifies a target data source. The operations further comprise generating (FIG. 2, 206) a wrapped uniform resource identifier (FIG. 5, 548) by wrapping the uniform resource identifier in a wrapper. The wrapped uniform resource identifier identifies a substitute data source that is different from the target data source. The operations further comprise generating (FIG. 2, 208) a replacement scannable encoded image (FIG. 5, 546) by encoding the wrapped uniform resource identifier. The operations further comprise generating (FIG. 2, 210) a replacement electronic message (FIG. 5, 544) by replacing the scannable encoded image in the electronic message with the replacement scannable encoded image. The operations further comprise providing (FIG. 2, 212) the replacement electronic message, which includes the replacement scannable encoded image, toward the recipient.

(F1) A second example computer program product (FIG. 8, 818, 822) comprising a computer-readable storage medium having instructions recorded thereon for enabling a processor-based system (FIG. 1, 102A-102M, 106A-106N; FIG. 7, 700; FIG. 8, 800) to perform operations. The operations comprise receiving (FIG. 6, 602) an electronic form (FIG. 7, 734) that is to be published in a cloud environment. The electronic form includes a scannable encoded image (FIG. 7, 736). The operations further comprise identifying (FIG. 6, 604) a uniform resource identifier (FIG. 7, 738) that is encoded in the scannable encoded image by decoding the scannable encoded image. The uniform resource identifier identifies a target data source. The operations further comprise generating (FIG. 6, 606) a wrapped uniform resource identifier (FIG. 7, 748) by wrapping the uniform resource identifier in a wrapper. The wrapped uniform resource identifier identifies a substitute data source that is different from the target data source. The operations further comprise generating (FIG. 6, 608) a replacement scannable encoded image (FIG. 7, 746) by encoding the wrapped uniform resource identifier. The operations further comprise generating (FIG. 6, 610) a replacement electronic form (FIG. 7, 744) by replacing the scannable encoded image in the electronic form with the replacement scannable encoded image. The operations further comprise publishing (FIG. 6, 612) the replacement electronic form, which includes the replacement scannable encoded image, in the cloud environment.

III. Example Computer System

FIG. 8 depicts an example computer 800 in which embodiments may be implemented. Any one or more of the user devices 102A-102M and/or any one or more of the servers 106A-106N shown in FIG. 1; the computing system 500 shown in FIG. 5; and/or the computing system 700 shown in FIG. 7 may be implemented in computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processor system 802, a system memory 804, and a bus 806 that couples various system components including system memory 804 to processor system 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing any one or more of (e.g., at least a portion of) the time-of-scan protection logic 108, the time-of-scan protection logic 508, the identification logic 512, the wrapping logic 514, the encoding logic 516, the message conversion logic 518, the unwrapping logic 520, the comparison logic 522, the access blocking logic 524, the confining logic 526, the maliciousness determination logic 528, the encrypting logic 530, the sandbox 532, the time-of-scan protection logic 708, the identification logic 712, the wrapping logic 714, the encoding logic 716, the form conversion logic 718, the unwrapping logic 720, the comparison logic 722, the access blocking logic 724, the confining logic 726, the maliciousness determination logic 728, the encrypting logic 730, the sandbox 732, flowchart 200 (including any step of flowchart 200), flowchart 300 (including any step of flowchart 300), flowchart 400 (including any step of flowchart 400), and/or flowchart 600 (including any step of flowchart 600), as described herein.

A user may enter commands and information into the computer 800 through input devices such as keyboard 838 and pointing device 840. Other input devices (not shown) may include a microphone, joystick, game pad, satellite dish, scanner, touch screen, camera, accelerometer, gyroscope, or the like. These and other input devices are often connected to the processor system 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface 850 (e.g., a network adapter), a modem 852, or other means for establishing communications over the network. Modem 852, which may be internal or external, is connected to bus 806 via serial port interface 842.

As used herein, the terms "computer program medium" and "computer-readable storage medium" are used to generally refer to media (e.g., non-transitory media) such as the hard disk associated with hard disk drive 814, removable magnetic disk 818, removable optical disk 822, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, communication media includes wireless media such as acoustic, RF, infrared and other wireless media, as well as wired media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A computing system comprising:

a processor system; and a memory that stores computer-executable instructions that are executable by the processor system to at least:

receive an electronic message that is directed to a recipient computing system, the electronic message including a scannable encoded image;

identify a uniform resource identifier that is encoded in the scannable encoded image by decoding the scannable encoded image, the uniform resource identifier identifying a target data source;

generate a wrapped uniform resource identifier by wrapping the uniform resource identifier in a wrapper, the wrapped uniform resource identifier identifying a substitute data source that is different from the target data source;

generate a replacement scannable encoded image by encoding the wrapped uniform resource identifier;

generate a replacement electronic message by replacing the scannable encoded image in the electronic message with the replacement scannable encoded image;

provide the replacement electronic message, which includes the replacement scannable encoded image, to the recipient computing system;

as a result of the replacement electronic message being provided to the recipient computing system, receive the wrapped uniform resource identifier from the recipient computing system; and based at least on receipt of the wrapped uniform resource identifier from the recipient computing system, block access of the recipient computing system to the target data source, which is identified by the uniform resource identifier.

2. The computing system of claim 1, wherein the computer-executable instructions are executable by the processor system to:

provide the replacement electronic message, which includes the replacement scannable encoded image in lieu of the scannable encoded image, to the recipient computing system.

3. The computing system of claim 1, wherein the computer-executable instructions are executable by the processor system further to:

not provide the electronic message, which includes the scannable encoded image, to the recipient computing system.

4. The computing system of claim 1, wherein the computer-executable instructions are executable by the processor system to:

encrypt the uniform resource identifier to provide an encrypted version of the uniform resource identifier; and generate the wrapped uniform resource identifier by wrapping the encrypted version of the uniform resource identifier in the wrapper.

5. The computing system of claim 1, wherein the computer-executable instructions are executable by the processor system to:

based at least on receipt of the wrapped uniform resource identifier from the recipient computing system, determine the uniform resource identifier by unwrapping the wrapped uniform resource identifier;

determine that the uniform resource identifier corresponds to a reference malicious uniform resource identifier by comparing the uniform resource identifier and the reference malicious uniform resource identifier; and block the access of the recipient computing system to the target data source, which is identified by the uniform resource identifier, based at least on the uniform resource identifier corresponding to the reference malicious uniform resource identifier.

6. The computing system of claim 5, wherein the computer-executable instructions are executable by the processor system to:

receive an indication that the replacement scannable encoded image is scanned by the recipient computing system, the indication including the wrapped uniform resource identifier.

7. The computing system of claim 1, wherein the computer-executable instructions are executable by the processor system to:

based at least on receipt of the wrapped uniform resource identifier from the recipient computing system, determine the uniform resource identifier by unwrapping the wrapped uniform resource identifier;

confine information, which is received from the target data source using the uniform resource indicator based at least on the wrapped uniform resource identifier being unwrapped, in a sandbox;

determine that the uniform resource identifier is a malicious uniform resource identifier based at least on a malicious action being initiated within the sandbox as a result of the information being confined in the sandbox; and block the access of the recipient computing system to the target data source outside the sandbox based at least on determining that the uniform resource identifier is the malicious uniform resource identifier.

8. The computing system of claim 1, wherein the computer-executable instructions are executable by the processor system to:

provide the replacement electronic message, which includes the replacement scannable encoded image, toward a plurality of recipient computing systems simultaneously.

9. A method implemented by a computing system, the method comprising:

receiving an electronic form that is to be published in a cloud environment, the electronic form including a scannable encoded image and a field that is configured to receive user-typed textual information;

identifying a uniform resource identifier that is encoded in the scannable encoded image by decoding the scannable encoded image, the uniform resource identifier identifying a target data source;

generating a wrapped uniform resource identifier by wrapping the uniform resource identifier in a wrapper, the wrapped uniform resource identifier identifying a substitute data source that is different from the target data source;

generating a replacement scannable encoded image by encoding the wrapped uniform resource identifier;

generating a replacement electronic form, which includes the field that is configured to receive the user-typed textual information, by replacing the scannable encoded image in the electronic form with the replacement scannable encoded image; and publishing the replacement electronic form, which includes the replacement scannable encoded image and the field that is configured to receive the user-typed textual information, in the cloud environment.

10. The method of claim 9, wherein receiving the electronic form comprises:

receiving a request to publish the electronic form in the cloud environment; and wherein publishing the replacement electronic form comprises:

based at least on receipt of the request to publish the electronic form, publishing the replacement electronic form, which includes the replacement scannable encoded image, in lieu of the electronic form, which includes the scannable encoded image.

11. The method of claim 9, wherein publishing the replacement electronic form comprises:

not publishing the electronic form, which includes the scannable encoded image, in the cloud environment.

12. The method of claim 9, further comprising:

encrypting the uniform resource identifier to provide an encrypted version of the uniform resource identifier;

wherein generating the wrapped uniform resource identifier comprises:

wrapping the encrypted version of the uniform resource identifier in the wrapper.

13. The method of claim 9, further comprising:

as a result of publishing the replacement electronic form in the cloud environment, receiving the wrapped uniform resource identifier from a second computing system;

based at least on receipt of the wrapped uniform resource identifier from the second computing system, determining the uniform resource identifier by unwrapping the wrapped uniform resource identifier;

determining that the uniform resource identifier corresponds to a reference malicious uniform resource identifier by comparing the uniform resource identifier and the reference malicious uniform resource identifier; and blocking access to the target data source, which is identified by the uniform resource identifier, based at least on the uniform resource identifier corresponding to the reference malicious uniform resource identifier.

14. The method of claim 13, wherein receiving the wrapped uniform resource identifier from the second computing system comprises:

receiving an indication that the replacement scannable encoded image is scanned by the second computing system, the indication including the wrapped uniform resource identifier.

15. The method of claim 9, further comprising:

as a result of publishing the replacement electronic form in the cloud environment, receiving the wrapped uniform resource identifier from a second computing system;

based at least on receipt of the wrapped uniform resource identifier from the second computing system, determining the uniform resource identifier by unwrapping the wrapped uniform resource identifier;

confining information, which is received from the target data source using the uniform resource indicator based at least on the wrapped uniform resource identifier being unwrapped, in a sandbox;

determining that the uniform resource identifier is a malicious uniform resource identifier based at least on a malicious action being initiated within the sandbox as a result of the information being confined in the sandbox; and blocking access to the target data source outside the sandbox based at least on determining that the uniform resource identifier is the malicious uniform resource identifier.

16. A computer program product comprising a computer-readable storage medium having instructions recorded thereon for enabling a processor-based system to perform operations, the operations comprising:

receiving an electronic message that is directed to a recipient computing system, the electronic message including a scannable encoded image;

identifying a uniform resource identifier that is encoded in the scannable encoded image by decoding the scannable encoded image, the uniform resource identifier identifying a target data source;

generating a wrapped uniform resource identifier by wrapping the uniform resource identifier in a wrapper, the wrapped uniform resource identifier identifying a substitute data source that is different from the target data source;

generating a replacement scannable encoded image by encoding the wrapped uniform resource identifier;

generating a replacement electronic message by replacing the scannable encoded image in the electronic message with the replacement scannable encoded image;

providing the replacement electronic message, which includes the replacement scannable encoded image, to the recipient computing system;

as a result of the replacement electronic message being provided to the recipient computing system, receiving the wrapped uniform resource identifier from the recipient computing system; and based at least on receipt of the wrapped uniform resource identifier from the recipient computing system, blocking access of the recipient computing system to the target data source, which is identified by the uniform resource identifier.

17. The computer program product of claim 16, wherein the operations further comprise:

not providing the electronic message, which includes the scannable encoded image, to the recipient computing system.

18. The computer program product of claim 16, wherein the operations further comprise:

encrypting the uniform resource identifier to provide an encrypted version of the uniform resource identifier;

wherein generating the wrapped uniform resource identifier comprises:

wrapping the encrypted version of the uniform resource identifier in the wrapper.

19. The computer program product of claim 16, wherein the operations comprise:

based at least on receipt of the wrapped uniform resource identifier from the recipient computing system, determining the uniform resource identifier by unwrapping the wrapped uniform resource identifier;

determining that the uniform resource identifier corresponds to a reference malicious uniform resource identifier by comparing the uniform resource identifier and the reference malicious uniform resource identifier; and blocking the access of the recipient computing system to the target data source, which is identified by the uniform resource identifier, based at least on the uniform resource identifier corresponding to the reference malicious uniform resource identifier.

20. The computer program product of claim 16, wherein the operations comprise:

based at least on receipt of the wrapped uniform resource identifier from the recipient computing system, determining the uniform resource identifier by unwrapping the wrapped uniform resource identifier;

confining information, which is received from the target data source using the uniform resource indicator based at least on the wrapped uniform resource identifier being unwrapped, in a sandbox;

determining that the uniform resource identifier is a malicious uniform resource identifier based at least on a malicious action being initiated within the sandbox as a result of the information being confined in the sandbox; and blocking the access of the recipient computing system to the target data source outside the sandbox based at least on determining that the uniform resource identifier is the malicious uniform resource identifier.

\* \* \* \* \*